(12) United States Patent
Lihme et al.

(10) Patent No.: US 9,192,907 B2
(45) Date of Patent: Nov. 24, 2015

(54) SYSTEM AND METHOD FOR PRODUCING BEADS

(75) Inventors: Allan Otto Fog Lihme, Birkerød (DK); Marie Bendix Hansen, Frederiksberg (DK); Rene Oehlenschlaeger Holte, Søborg (DK); Brian Larsen, Kastrup (DK)

(73) Assignee: DPX Holdings B.V., Amsterdam (NL)

( * ) Notice: Subject to any disclaimer, the term of this patent is extended or adjusted under 35 U.S.C. 154(b) by 557 days.

(21) Appl. No.: 12/745,611

(22) PCT Filed: Dec. 2, 2008

(86) PCT No.: PCT/EP2008/066659
§ 371 (c)(1),
(2), (4) Date: Oct. 13, 2010

(87) PCT Pub. No.: WO2009/071560
PCT Pub. Date: Jun. 11, 2009

(65) Prior Publication Data
US 2011/0018153 A1    Jan. 27, 2011

(30) Foreign Application Priority Data

Dec. 3, 2007   (DK) .......................... PA 2007 01722

(51) Int. Cl.
*B01J 2/08*   (2006.01)
*B01J 13/04*  (2006.01)

(52) U.S. Cl.
CPC ..................... *B01J 13/046* (2013.01)

(58) Field of Classification Search
CPC .. B01J 13/0052; B01J 13/0056; B01J 13/006; B01J 13/0065; B01J 13/0069; B01J 13/0086; B01J 13/0046; B01J 13/08; B01J 13/12; B01J 13/14; B01J 13/20; B01J 13/206; B01J 2/06; B01J 2/08
USPC ........................ 264/4, 4.1, 5, 9, 13
See application file for complete search history.

(56) References Cited

U.S. PATENT DOCUMENTS 4,732,811 A * 3/1988 Margel ............................ 428/403
4,971,833 A * 11/1990 Larsson et al. ............ 427/213.33
(Continued)

FOREIGN PATENT DOCUMENTS

| CN | 1457919 | 11/2003 |
|----|---------|---------|
| CN | 1640539 | 7/2005  |

(Continued)

OTHER PUBLICATIONS

Tong et al, Nd—Fe—B alloy-densified agarose gel for expanded bed adsorption of proteins, 2001, Journal of Chromatography A, 943, pp. 63-75.*

(Continued)

*Primary Examiner* — Timothy Kennedy
(74) *Attorney, Agent, or Firm* — Pierce Atwood LLP; Raymond G. Arner

(57) ABSTRACT

The present invention relates to a method for producing beads comprising a material capable of gelation, said method comprising the steps of: (i) combining (a) a liquid composition comprising a material capable of gelation; and (b) a first hydrophobic phase; (ii) subjecting the liquid composition and the first hydrophobic phase, to means for emulsification in a first reactor by addition of external mechanical energy creating an emulsion comprising individual droplets comprising the material capable of gelation in the first hydrophobic phase (wherein the material capable of gelation provides a discontinuous phase and the first hydrophobic phase provides a continuous phase); (iii) stabilizing the droplets by transferring the emulsion from the first reactor to a stabilization reactor wherein the emulsion obtained in step (ii) is subjected to means for gelation in order to obtain gelation within 5 minutes or less, and the beads are formed.

36 Claims, 3 Drawing Sheets

(56) References Cited

U.S. PATENT DOCUMENTS

| | | | |
|---|---|---|---|
| 5,723,601 A * | 3/1998 | Larsson | 536/103 |
| 5,866,006 A * | 2/1999 | Lihme et al. | 210/635 |
| 5,935,442 A * | 8/1999 | Lihme et al. | 210/656 |
| 6,043,067 A * | 3/2000 | Lihme et al. | 435/174 |
| 6,492,471 B1 * | 12/2002 | Eisenbeiss et al. | 526/88 |
| 6,841,097 B2 * | 1/2005 | Andersson et al. | 264/5 |
| 8,177,537 B2 | 5/2012 | Cheng et al. | |
| 2007/0069408 A1 | 3/2007 | Cheng et al. | |
| 2010/0227015 A1 | 9/2010 | Cheng et al. | |

FOREIGN PATENT DOCUMENTS

| | | |
|---|---|---|
| CN | 1939582 A | 4/2007 |
| EP | 1 764 151 | 3/2007 |
| JP | 2005-248406 | 9/2005 |
| JP | 2007077397 A | 3/2007 |
| JP | 2007-237050 | 9/2007 |
| WO | 92/00799 | 1/1992 |
| WO | 93/19115 | 9/1993 |
| WO | 97/17132 A1 | 5/1997 |
| WO | 00/57982 A1 | 10/2000 |
| WO | 02/096215 A1 | 12/2002 |
| WO | 2004/008138 | 1/2004 |
| WO | 2005121165 A1 | 12/2005 |
| WO | 2006/033634 | 3/2006 |
| WO | 2006/039916 | 4/2006 |
| WO | 2009/071560 | 6/2009 |

OTHER PUBLICATIONS

Xia et al, Evaluation of new high-density ion exchange adsorbents for expanded bed adsorption chromatography, 2007, Journal of Chromatography A, 1145, pp. 58-66.*

Xia et al, Preparation and characterization of macroporous cellulose—tungsten carbide composite beads for expanded bed applications, 2007, Journal of Chromatography A, 1175, pp. 55-62.*

"*Principles of operation of static mixers*", http://www.stamixco-usa.com/principles-of-operation/default.html.

Audet et al; "*Two-phase Dispersion Process for the Production of Biopolymer Gel Beads: Effect of Various Parameters on Bead Size and Their Distribution*", Process Biochemistry, vol. 24, No. 6, Dec. 1989.

XP-002525780, CN20041000087, Abstract (2005).

International Search Report for PCT/EP2008/066659, mailed May 12, 2009.

Written Opinion of the International Searching Authority, mailed May 12, 2009.

CN Office Action dated Aug. 10, 2010.

* cited by examiner

SYSTEM AND METHOD FOR PRODUCING BEADS

This application is the U.S. national phase of International Application No. PCT/EP2008/066659, filed 2 Dec. 2008, which designated the U.S. and claims priority to Denmark Application No. PA 2007 01722, filed 3 Dec. 2007, the entire contents of each of which are hereby incorporated by reference.

FIELD OF THE INVENTION

The present invention relates to a system and a method for producing beads, such as high density beads. More particularly, the present invention relates to a continuous process and apparatus for making beads, such as high density beads comprising a high density core particle surrounded by a polymeric material.

BACKGROUND OF THE INVENTION

Beads comprising polymeric material are commonly used as base matrix for chromatography media and the most commonly used polymeric material is agarose. Agarose is ideal as a base matrix because of its minimal non-specific absorption, hydrophilicity, strong chemical resistance to e.g. base and solvents, high porosity and abundance of OH-groups for cross-linking and functionalization. One class of chromatographic media comprises one or more core particle(s) with an agarose coating on the outside. Such beads are, in particular, useful for fluidized bed adsorption because the density of such beads must be controlled to counter the buoyancy of the fluidizing flow, but may also be used as ion-exchange and affinity packed-bed media.

A common method of making agarose beads is by contacting an aqueous liquid comprising agarose with a hydrophobic liquid in a stirring vessel. This batch process is often used for making both homogeneous and cored beads. The agarose solids are suspended in water in the presence of the core material and then heated to or above the melting point of the agarose (about 90° C.). The hot agarose solution is then poured into a hot hydrophobic fluid in a stirring vessel. The hydrophobic fluid can be a solvent such as toluene or mineral oil. Since the aqueous agarose solution and the hydrophobic fluid don't mix, constant agitation turns the two liquids into an emulsion with the core material surrounded by the hot agarose solution as small droplets suspended in the hydrophobic fluid. Normally, a surfactant soluble in the phobic fluid is added to stabilize the small droplets so they don't coalesce into larger ones. The emulsion is then gradually cooled in the stirring tank about 30-300 minutes to solidify the droplets into gelled beads. The beads may then be washed and sieved to narrow the distribution to the useful range.

In EP 1 764 151 (same as US 2007/0069408) a different method for producing agarose or agarose beads with a solid core is described. The process involves dissolving/melting the agarose in a suitable liquid, mixing it with a hydrophobic liquid to form an emulsion and maintaining that emulsion at a temperature equal to or greater than the gelation point of the agarose, passing the emulsion through a static mixer to create agarose droplets and solidifying the agarose droplets in a second bath of hydrophobic liquid. The beads can then be recovered by decanting or centrifugation separation. The beads may be washed and used or further processed to crosslink the agarose and/or add various functionalities on to the agarose. EP 1 764 151 uses a static mixer instead of a stirring vessel to minimize non-uniformities in the agarose bead formation and in order to create a continuous method for making the beads.

In CN 1457919 A is disclosed a method for preparing a high density core material coated with a thin shell medium of agarose gel by preparing a suspension and emulsifying in a salad oil under the addition of emulsifier. Beads are formed by cooling in the same reactor.

In the prior art most disclosures are directed to bench scale methods in which the whole method, heating, emulsifying and cooling, takes place within the same reaction vessel over a period of 30 minutes or more. In actual mass production scale, or industrial scale production, the process time, in particular the cooling time, may be much longer. A further problem in the prior art disclosures is that the methods described in the prior art are either not continuous methods or insufficient shear forces are being used when providing the emulsion of core particles; polymeric material (e.g. agarose) and hydrophobic liquid to provide high density beads preferably of a small average size avoiding or minimizing coalescing of beads into larger aggregated beads and irregular lumps.

Thus, instead of bulky batch methods, it is desirable to use a truly continuous process for bead production, such as high density bead production. Although various types of bead production methods are researched and documented, patents and literatures are silent when it comes to a continuous industrial scale production of beads, such as high density beads.

Hence, it is desirable to provide an improved method and an improved system for producing beads, such as high density beads, and in particular a continuous industrial scale production of beads, such as high density beads being of highly regular spherical shape and of small average particle size with minimal bead aggregation. The present invention provides such a process.

OBJECT OF THE INVENTION

It is an object of embodiments of the invention to provide a method and a system for producing beads, such as high density beads, on a continuous and industrial scale.

SUMMARY OF THE INVENTION

Thus, one aspect of the invention relates to a method for producing beads comprising a material capable of gelation, said method comprising the steps of:
  (i) combining (a) a liquid composition comprising a material capable of gelation; and (b) a first hydrophobic phase;
  (ii) subjecting the liquid composition and the first hydrophobic phase, to means for emulsification in a first reactor by addition of external mechanical energy creating an emulsion comprising individual droplets comprising the material capable of gelation in the first hydrophobic phase (wherein the material capable of gelation provides a discontinuous phase and the first hydrophobic phase provides a continuous phase);
  (iii) stabilising the droplets by transferring the emulsion from the first reactor to a stabilisation reactor wherein the emulsion obtained in step (ii) is subjected to means for gelation in order to obtain gelation within 5 minutes or less, and the beads are formed.

Another aspect of the present invention relates to a system comprising a first reactor, said first reactor comprising:
  (i) means for emulsifying (a) a liquid composition comprising a material capable of gelation; and (b) a first hydrophobic phase, by addition of external mechanical energy to create an emulsion comprising individual droplets comprising the material capable of gelation in the first hydrophobic phase (wherein the material capable of gelation provides a discontinuous phase and the first hydrophobic phase provides a continuous phase); and (ii) at least one outlet, said outlet transferring the emulsion from the first reactor to a stabilisation reactor for stabilising the droplets.

LEGENDS TO THE FIGURE

Figure 1:
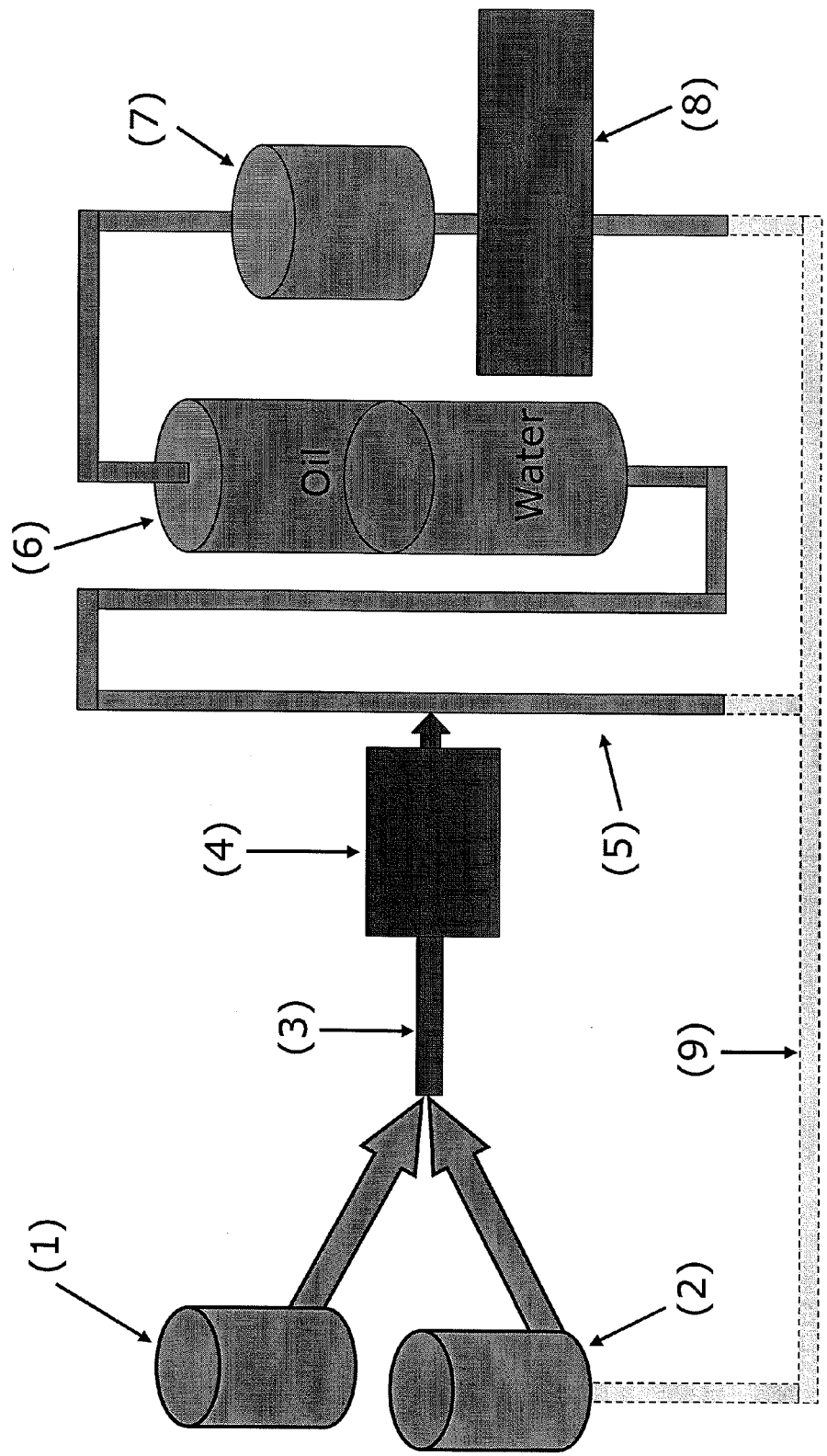
FIG. 1 shows the method and the system of the present invention for producing high density beads.

The present invention will now be described in more detail in the following.

DETAILED DISCLOSURE OF THE INVENTION

Beads, such as high density beads according to the present invention may be used for several purposes. In particular, the beads, such as high density beads according to the present invention may be used for chromatography, such as fluidised bed adsorption, expanded bed adsorption, packed bed adsorption, e.g. in order to isolate or separate specific compounds from a complex medium. A complex medium may be a medium derived from natural sources such as milk, blood, fruit extracts, vegetable extracts, fish extracts or the medium may be derived from a fermentation process or the medium may be an industrial waste, waste water or the like.

Production of beads, such as high density beads for use in e.g. chromatography has been problematic, before the present invention was provided, because the droplets, such as high density droplets formed during production of the beads, such as high density beads tend to coalesce either during emulsification of the material capable of gelation, such as the polymeric material (optionally in combination with the density controlling core particle) and the first hydrophobic phase, such as an organic phase or before the beads, such as high density beads are being sufficiently stabilised, such as by being cooled in order to provide stabilised beads, such as high density stabilised beads. In the present context the term "stabilised beads" and "stabilised high density beads" relates to beads which do not coalesce at temperatures below the melting point and/or the gelling point of the material capable of gelation, such as the polymeric material, preferably at temperatures of 10° C. or more below the melting point of the material capable of gelation, such as the polymeric material, more preferably at temperatures of 20° C. or more below the melting point of the material capable of gelation, such as the polymeric material, even more preferably at temperatures of 30° C. or more below the melting point of the material capable of gelation, such as the polymeric material or even more preferably at temperatures of 40° C. or more below the melting point of the material capable of gelation, such as the polymeric material. In the present context the terms "stabilised high density beads" and "high density beads" may be used interchangeably. In the present context the terms "stabilised beads" and "beads" may be used interchangeably.

In the present context the term "material capable of gelation" refers to a material which is liquefied when heated above the melting point of the material capable of gelation and capable of changing from a liquid state to a solid, hydrated state (gel) when subjected to means for gelation, such as by cooling of the material to a temperature below the gelation point. The "melting point" is often higher than the gelation point.

In an embodiment of the invention the material capable of gelation comprises a polymeric material.

The term "liquid composition" in the present context refers to a suspension or solution of the material capable of gelation in a solvent.

In an embodiment of the invention the liquid composition is a suspension.

In an embodiment of the invention the suspension is an aqueous suspension.

In an embodiment of the invention the liquid composition is a solution.

In an embodiment of the invention the first hydrophobic phase comprises an organic phase and/or an inorganic phase.

In an embodiment of the invention the organic phase is an oil, such as a mineral oil.

In an embodiment of the invention the organic phase is a vegetable oil or a silicone oil.

An aspect of the invention is a method for producing high density beads comprising a material capable of gelation and a density controlling core particle.

A further aspect of the invention is to provide a method for producing beads, such as high density beads, that are substantially non-aggregated, non-deformed or misshapen, which method provide means to avoid coalescence of the emulsion droplets (the discontinuous phase) under their stabilisation to become gelated beads. In the present context the term "beads which do not coalesce" relates to substantially no coalescence of the droplets, such as high density droplets produced during production of the beads, such as high density beads according to the present invention. Substantially no coalescence relates to no or limited formation of aggregates, deformations and misshapen structures, and fibrous entities of a material capable of gelation, such as agarose and a density controlling core particle, such as tungsten carbide and may preferably be less than 5% of the aqueous suspension coalesces, such as less than 3% of the aqueous suspension coalesces, e.g. less than 1% of the aqueous suspension coalesces, such as less than 0.5% of the aqueous suspension coalesces or e.g. less than 0.1% of the aqueous suspension coalesces.

The term "aqueous suspension" relates in the present context to a suspension of the material capable of gelation, such as the polymeric material, and optionally the density controlling core particle, preferably, as a melted suspension (of the density controlling core particle, if any, in the polymeric material), when heated above the melting point of the material capable of gelation, such as the polymeric material, either in the presence or in the absence of aqueous solvent, e.g. water.

Due to the present invention it has now become possible to provide a method for producing beads, such as high density beads in a continuous process.

Furthermore, it has become possible to provide a method for producing beads, such as high density beads at an industrial scale. In particular, it has become possible to provide a method for producing beads, such as high density beads in a continuous process at an industrial scale.

In the present invention the term "industrial scale" relates to the production of at least 5 kg of beads, such as high density beads/hour, such as at least 10 kg of beads, such as high density beads/hour, e.g. at least 15 kg of beads, such as high density beads/hour, such as at least 30 kg of beads, such as high density beads/hour, e.g. at least 50 kg of beads, such as high density beads/hour, depending on the specific application of the beads, such as high density beads.

To provide the beads, such as high density beads a first mixture comprising a) the liquid composition, such as the suspension of density controlling core particle, if any, in the material capable of gelation, such as the polymeric material and b) the first hydrophobic phase, such as an organic phase, may be subjected to means for emulsifying. In the present context the term "means for emulsifying" relates to an emulsification process by which an emulsion is prepared. An emulsion is a mixture of immiscible (unblendable) substances. Thus, one substance (the dispersed phase, such as the aqueous suspension) is dispersed in the other (the continuous phase, such as the first and/or the second hydrophobic phase, such as the first and/or the second organic phase).

In the context of the present invention the term "first mixture" relates to a mixture of the liquid composition, such as the aqueous suspension (the density controlling core particle, if any, and the material capable of gelation, such as the polymeric material) and the first hydrophobic phase, such as the first organic phase before an emulsion is formed. In the present context the term "emulsion" relates to a mixture where a discontinuous phase (the liquid composition, such as the aqueous suspension) and a continuous phase (the first hydrophobic phase, such as the first organic phase) is formed.

In an embodiment of the present invention the size distribution of the bead, such as the high density bead and/or the density of the bead, such as the high density bead may be determined by the extent of the external mechanical energy added, e.g. the mixing speed of a mechanical mixer, such as an in-line mixer.

Furthermore, size distribution of the bead, such as the high density bead and/or the density of the bead, such as the high density bead may be determined by the flow rate of the first mixture comprising the density controlling core particle, if any, and the material capable of gelation, such as the polymeric material and the first hydrophobic phase, such as the organic phase, from mixing, emulsification and stabilisation, such as by cooling (stabilisation).

Furthermore, size distribution of the bead, such as the high density bead and/or the density of the bead, such as the high density bead may be determined by the density of the density controlling core particle, if any as well as the density of the liquid composition, such as the aqueous suspension of the density controlling core particle, if any, and the material capable of gelation, such as the polymeric material.

Additionally, the size distribution of the bead, such as the high density bead and/or the density of bead, such as the high density bead may be determined by the viscosity of the liquid composition, such as the aqueous suspension comprising the melted material capable of gelation, such as the polymeric material and the density controlling core particle, if any, to be emulsified in the first hydrophobic phase, such as the first organic phase. In particular, the concentration of the material capable of gelation, such as the polymeric material may have an influence on the resulting size of the beads, such as the high density beads.

In a further embodiment of the present invention the viscosity of the first hydrophobic phase, such as the first organic phase and/or the viscosity of the emulsion may influence the size distribution of the beads, such as the high density beads and/or the density of the beads, such as the high density beads.

In an embodiment of the present invention the size distribution of the beads, such as the high density beads and/or the density of the beads, such as the high density beads may be influenced by at least two of the above mentioned features (extent of the external mechanical energy added; flow rate; viscosity of the material capable of gelation, such as the polymeric material, the viscosity of the liquid composition, such as the aqueous suspension; the density of the density controlling core particle, if any, the density of the liquid composition, such as the aqueous suspension of the density controlling core particle, if any, and the material capable of gelation, such as the polymeric material; the viscosity of the first hydrophobic phase, such as the first organic phase and the viscosity of the emulsion), such as at least 3 of the above mentioned features, e.g. 4 of the above mentioned features, such as at least 5 of the above mentioned features, e.g. 6 of the above mentioned features.

Preferably, the size distribution and/or the density of the bead(s), such as the high density bead(s) may be controlled by the extent of external mechanical energy provided in step (ii).

In a preferred embodiment of the present invention the emulsification process involves addition of external mechanical energy to the first mixture of the density controlling core particle, if any, the material capable of gelation, such as the polymeric material and the first hydrophobic phase, such as the first organic phase.

Preferably, the external mechanical energy corresponds to at least 10 Watt/L reactor volume, such as at least 25 Watt/L reactor volume, e.g. at least 50 Watt/L reactor volume, such as at least 75 Watt/L reactor volume, e.g. at least 90 Watt/L reactor volume, such as at least 100 Watt/L reactor volume, e.g. at least 250 Watt/L reactor volume, such as at least 400 Watt/L reactor volume, e.g. at least 500 Watt/L reactor volume, such as at least 750 Watt/L reactor volume, e.g. at least 1000 Watt/L reactor volume, such as at least 1250 Watt/L reactor volume, e.g. at least 1500 Watt/L reactor volume, such as at least 1750 Watt/L reactor volume, such as at least 2000 Watt/L reactor volume, e.g. at least 3000 Watt/L reactor volume, such as at least 5000 Watt/L reactor volume, e.g. at least 10.000 Watt/L reactor volume.

In an embodiment of the invention the external mechanical energy corresponds to at least 100 Watt/L reactor volume, such as at least 250 Watt/L.

In an embodiment of the invention the external mechanical energy corresponds to at least 1000 Watt/L reactor volume, such as at least 2000 Watt/L.

The reactor volume may be referred to as the liquid filling volume of the first reactor wherein the external mechanical energy is applied. The first reactor may have the form of a cube, sphere or a cavity having at least one liquid inlet and one liquid outlet or it may be even in the form of a tube or pipe having a defined and localised zone where the external mechanical input is applied to the fluids introduced.

The emulsification process may be provided by addition of an external mechanical energy, such as mechanical mixing, shaking, stirring, agitating, spraying, rotating, mechanical vibration, grinding, shearing, squeezing, using pressure waves, such as ultrasonics; or a combination hereof. In an embodiment of the present invention the emulsification process may be further combined with chemical action, such as addition of a surfactant or an emulsifier.

In a preferred embodiment of the present invention the emulsification process may be provided by mechanical action, preferably, by the action of a mechanical mixer, such as an in-line mixer.

The terms "mechanical mixer" and "dynamic mixers" may be used interchangeably in the field of the present invention. However, the functioning and the effect of the two terms are considered the same. Preferably, the mechanical mixer (or the dynamic mixer) is operated at a speed of 100 rpm or more, such as a speed of 200 rpm or more, e.g. a speed of 500 rpm or more, such as a speed of 1000 rpm or more, e.g. a speed of 1500 rpm or more, such as a speed of 2000 rpm or more, e.g. a speed of 2500 rpm or more, such as a speed of 3000 rpm or more, e.g. a speed of 3500 rpm or more, such as a speed of 4000 rpm or more, e.g. a speed of 4500 rpm or more, such as a speed of 10,000 rpm or more, e.g. a speed of 20,000 rpm or more, such as a speed of 30,000 rpm or more, e.g. a speed of 50,000 rpm or more.

In an embodiment of the invention the external mechanical energy is provided by a mechanical mixer operated at a speed of 100 rpm or more, such as 200 rpm or more, such as 500 rpm or more.

In an embodiment of the invention the external mechanical energy is provided by a mechanical mixer operated at a speed of 1000 rpm or more, such as 3000 rpm or more, such as 6000 rpm or more.

Preferably the external mechanical energy may be provided by an in-line mixer. In the present context the term "in-line mixer" relates to a device functioning by exerting a powerful suction, drawing the liquid composition, such as the aqueous suspension and the first hydrophobic phase, such as the first organic phase into the rotor/stator assembly, then centrifugal forces drives the first mixture towards the periphery where they are subjected to a milling action creating the emulsion. This is followed by intense hydraulic shear as the emulsion formed is forced, at high velocity, out through perforations in the stator, then through the machine outlet and along a pipework. At the same time, fresh liquid composition, such as the aqueous suspension and the first hydrophobic phase, such as the first organic phase is continually drawn into the in-line mixer, maintaining the mixing and pumping cycle, and thereby contributing to the establishment of a continuous method of producing beads, such as high density beads. It should be mentioned that the skilled person would easily select other means for emulsifying where said means are capable of performing similar functions.

In the present context the term "external mechanical energy" does not involve static mixers as these mixers are not considered to supply external mechanical energy and that the energy supplied by a static mixer is not sufficient to provide the beads, such as high density beads.

Static mixers are generally used in processes involving an exchange of momentum, heat and/or mass. Static mixers may be employed for homogenization, for reduction of the residence time spectrum, for dispersion and heat transfer in continuous operations. A static mixer is a device for blending (mixing) of two miscible liquid or vapour flows, dispersion of immiscible liquids creating an emulsion, dispersion of gases in liquids and heat transfer.

Static mixers are different from mechanical (dynamic) mixers (pumps, agitators), because they have no moving parts. The mixing energy is delivered by the pumps transporting the liquids through the system and is extracted from the flow through the pressure drop.

Therefore, the efficiency of a static mixer is highly dependent, and limited, by the liquid flow rate applied. This is not the case for a dynamic/mechanical device, which will enable a very high energy input localised at any chosen confined location in the process line.

Thus, the inventors of the present invention have found that static mixers are insufficient for creating beads, such as high density beads due to the relatively low energy per volume unit available for emulsification of the liquid composition, such as the aqueous suspension in the first hydrophobic phase, such as the first organic phase.

The Method

In an embodiment of the method according to the invention_steps (i) and/or (ii) therein are conducted at a temperature above the gelation point of the material capable of gelation.

In an embodiment of the invention the means for gelation comprises thermal gelation by reducing the temperature of the emulsion from above the gelation point to a temperature below the gelation point.

By the term "thermal gelation" in the present context is meant formation of a gel by means of temperature change of the material capable of gelation from a temperature above the gelation point to a temperature below the gelation point in order to obtain non-agglomerated single particle beads.

In a preferred aspect of the present invention a method for producing high density bead(s) having a density of 1.5 g/mL or more and comprising a density controlling core particle surrounded by a polymeric material is provided. The method comprises the steps of:

(i) adding (a) an aqueous suspension comprising the density controlling core particle and the polymeric material; and (b) a first organic phase to a first reactor;

(ii) subjecting the aqueous suspension and the first organic phase, to means for emulsification by addition of external mechanical energy creating an emulsion comprising individual high density droplet(s) comprising the density controlling core particle surrounded by the polymeric material in the first organic phase (wherein the density controlling core particle surrounded by the polymeric material provides a discontinuous phase and the first organic phase provides a continuous phase);

(iii) stabilising the high density droplets by transferring the emulsion from the first reactor to a stabilisation reactor where the temperature of the emulsion obtained in step (ii) is reduced to a temperature below the gelation point of the polymeric material within 5 minutes or less and the high density beads are formed, wherein steps (i) and/or (ii) are conducted at a temperature above the gelation point of the polymeric material.

In an embodiment the method according to the invention is for producing high density beads having a density of 2.0 g/mL or more.

In an embodiment the method according to the invention is for producing high density beads having a density of 3.0 g/mL or more.

In the present context the term "high density droplet(s)" relates to the high density core particle surrounded by the polymeric material wherein the polymeric material is in liquefied form.

In order to make the emulsion the temperature of the density controlling core particle, if any, and the material capable of gelation, such as the polymeric material in the first hydrophobic phase, such as the first organic phase should be at or above the melting point of the material capable of gelation, such as the polymeric material. Preferably, the temperature should be 1° C. or more above the melting point of the material capable of gelation, such as the polymeric material such as 5° C. or more above the melting point of the material capable of gelation, such as the polymeric material, such as 10° C. or more above the melting point of the material capable of gelation, such as the polymeric material, e.g. 20° C. or more above the melting point of the material capable of gelation, such as the polymeric material, such as 30° C. or more above the melting point of the material capable of gelation, such as the polymeric material, e.g. 40° C. or more above the melting point of the material capable of gelation, such as the polymeric material.

In yet an embodiment of the present invention the gelation point of the material capable of gelation, such as the polymeric material may be lower than the melting point of the material capable of gelation, such as the polymeric material and then the temperature may be regulated to less than the melting point (but above the gelling point of the material capable of gelation, such as the polymeric material) prior to entry into the first reactor. In such a situation then the temperature should preferably be 5° C. or more above the gelling point of the material capable of gelation, such as the polymeric material, such as 10° C. or more above the gelling point of the material capable of gelation, such as the polymeric material, e.g. 20° C. or more above the gelling point of the material capable of gelation, such as the polymeric material, such as 30° C. or more above the gelling point of the material capable of gelation, such as the polymeric material, e.g. 40° C. or more above the gelling point of the material capable of gelation, such as the polymeric material.

In an embodiment of the present invention the temperature of the density controlling core particle, if any, and the material capable of gelation, such as the polymeric material, and/or the first hydrophobic phase, such as the first organic phase in step (i) and/or (ii) is 40° C. or more, such as 50° C. or more, e.g. 70° C. or more, such as 80° C. or more, e.g. 90° C. or more, such as 110° C. or more, e.g. 120° C. or more, such as in the range of 40-120° C., e.g. in the range of 50-110° C., such as in the range of 40-95° C., e.g. in the range of 60-90° C., such as about 80° C.

In the present context the term "melting point" relates to the state where the material capable of gelation, such as the polymeric material changes from a solid phase to a liquid phase.

The liquid composition, such as the aqueous suspension and the first hydrophobic phase, such as the first organic phase may be added, sequentially, separately, simultaneously or as a heterogeneous mixture, to a first reactor. The first hydrophobic phase, such as the first organic phase may preferably be oil, such as mineral oil, which may be heated at or above the temperature of the melting point or the gelation point of the material capable of gelation, such as the polymeric material, such as agarose, in order to keep it in solution. This forms a liquid emulsion having a continuous and discontinuous phase in which the hydrophobic phase, such as the oil is the continuous phase and the liquid composition, such as the aqueous suspension comprising the density controlling core particle, if any, surrounded by the material capable of gelation, such as the polymeric material is the discontinuous phase. The first mixture comprising the liquid composition, such as the aqueous suspension and the first hydrophobic phase, such as the first organic phase is mechanically treated e.g. stirred or agitated to create the emulsion, preferably the speed of the stirring or agitation may influence the resulting size and/or density of the beads, such as high density beads and/or droplets, such as high density droplets. Other features that may influence on the size and/or density of the beads, such as high density beads and/or droplets, such as high density droplets may be the temperature of the emulsion, the concentration of material capable of gelation, such as the polymeric material, such as agarose, added to the liquid composition, such as the aqueous suspension, the viscosity of the first hydrophobic phase, such as the first organic phase, the viscosity of the melted material capable of gelation, such as the polymeric material and the density controlling core particle, if any to be emulsified, the density of the density controlling core particle, if any and the density of the aqueous suspension of the density controlling core particle, if any and the material capable of gelation, such as the polymeric material, the volume of the liquid composition, such as the aqueous suspension comprising the density controlling core, if any and the material capable of gelation, such as the polymeric material relative to the volume of the first hydrophobic phase, such as the first organic phase or any combination hereof.

In an embodiment of the present invention the emulsion comprises a ratio between the liquid composition, such as the aqueous suspension comprising the density controlling core, if any and the material capable of gelation, such as the polymeric material and the first hydrophobic phase, such as the first organic phase which is in the range of 1:1-1:20, such as in the ratio 1:1.5-1:10, e.g. in the ratio 1:2-1:10, such as in the ratio 1:3-1:10, e.g. in the ratio 1:3-1:8, such as in the ratio 1:3-1:5, e.g. in the ratio 1:3-1:4.

Preferably, the liquid composition, such as the aqueous suspension comprises the density controlling core particle 1% v/v or more of the density controlling core particle relative to the material capable of gelation, such as the polymeric material, such as 3% v/v or more, such as 5% v/v or more, such as 8% v/v or more, such as 10% v/v or more, such as 12% v/v or more, such as 15% v/v or more, such as 20% v/v or more, such as 25% v/v or more of the density controlling core particle relative to the material capable of gelation, such as the polymeric material.

A method of making beads, such as high density beads may involve creating a liquid composition, such as the aqueous suspension by addition of the material capable of gelation, such as the polymeric material and the density controlling core particle, if any to a vessel or tank, optionally with an aqueous solvent followed by heating to a temperature at or above the melting point of the material capable of gelation, such as the polymeric material. Depending on the material capable of gelation, such as the polymeric material, preferably, this is generally from about 80° C. to about 120° C., e.g. in order to dissolve the material capable of gelation, such as the polymeric material in the liquid composition, such as the aqueous suspension. Thus, before adding the material capable of gelation, such as the polymeric material to the first reactor the material capable of gelation, such as the polymeric material may be suspended in an aqueous solvent or melted. Preferably, the density controlling particle, if any and the material capable of gelation, such as the polymeric material may be heated to a temperature above the melting point of the material capable of gelation, such as the polymeric material before being added to the first reactor.

In a preferred embodiment of the present invention the material capable of gelation, such as the polymeric material may be mixed with the density controlling core particle prior to being added to the first reactor with the first hydrophobic phase, such as the first organic phase in step (i). Furthermore, preferably the density controlling core particle, if any and the material capable of gelation, such as the polymeric material is heated to a temperature above the melting point of the material capable of gelation, such as the polymeric material before being mixed with the first hydrophobic phase, such as the first organic phase and/or before being added to the first reactor.

In the present context the term "aqueous solvent" relates to a liquid that is suitable for dissolving the material capable of gelation, such as the polymeric material. Preferably, the aqueous solvent is water. In an embodiment of the present invention a minor amount, up to 20% by weight of the liquid composition, such as the aqueous suspension, of one or more co-solvents may be added to improve the solubility of the material capable of gelation, such as the polymeric material. Examples of suitable co-solvents may be N-methylpyrrolidone, dimethylacetamide and/or dimethylsulfoxide. Other types of suitable aqueous solvent and co-solvents are well known to the person skilled in the art.

In a preferred embodiment of the present invention the material capable of gelation, such as the polymeric material is allowed to gel and the beads, such as high density beads are formed by reducing the temperature below the gelation point of the material capable of gelation, such as the polymeric material. Preferably, the droplets, such as high density droplets may be stabilised by contacting the emulsion of step (iii) or part of said emulsion with a second hydrophobic phase, such as the second organic phase.

In an embodiment of the invention the droplets are stabilised by contacting the emulsion of step (iii) or part of said emulsion with a second hydrophobic phase in the stabilisation reactor.

The emulsion may be flowed or pumped through a suitable device to create small emulsion portions suitable for fast cooling (a fast reduction in temperature favours stabilised beads, such as high density beads with minimal agglomeration and deformation of the beads).

In a preferred embodiment the emulsion or the small portions of the emulsion exit the first reactor into a second reactor comprising a second hydrophobic phase, such as the second organic phase (preferably with no emulsifier and/or surfactants) maintained at a temperature below that of the gelation point of the material capable of gelation, such as the polymeric material. This causes the droplets, such as high density droplets comprising the density controlling core particle, if any surrounded by the material capable of gelation, such as the polymeric material to gel and form self supporting material capable of gelation, such as the polymeric material structures of a generally spherical shape (beads, such as high density beads).

In an embodiment of the invention the second hydrophobic phase comprises an organic phase and/or an inorganic phase.

In an embodiment of the invention the second hydrophobic phase is an oil, such as a mineral oil.

In an embodiment of the invention the second hydrophobic phase is a vegetable oil or a silicone oil.

In a preferred embodiment of the present invention the first and the second hydrophobic phase, such as the first and second organic phase are of the same chemical origin. Preferably, the first and the second hydrophobic phase, such as the first and second organic phase are both oil, such as a mineral oil.

In yet an embodiment of the present invention the flow rate of the second hydrophobic phase, such as the second organic phase is at least 2 times higher than the flow rate of the emulsion, such as at least 5 times higher than the flow rate of the emulsion, e.g. at least 10 times higher than the flow rate of the emulsion, such as at least 12 times higher than the flow rate of the emulsion, e.g. at least 15 times higher than the flow rate of the emulsion, such as at least 17 times higher than the flow rate of the emulsion, e.g. at least 19 times higher than the flow rate of the emulsion, such as at least 20 times higher than the flow rate of the emulsion, e.g. at least 25 times higher than the flow rate of the emulsion.

As the important part of the present invention is to transfer the emulsion and the droplets, such as the high density droplets from the first reactor and the zone of external mechanical input to the second hydrophobic phase, such as the second organic phase to cool and stabilise the beads, such as high density beads as quickly as possible, modes of transferring the emulsion to the second hydrophobic phase, such as the second organic phase to quickly cool and stabilise the droplets, such as high density droplets will be known for the person skilled in the art. However, in an embodiment of the present invention the emulsion or the part of the emulsion and the droplets, such as high density droplets may be contacted with the second hydrophobic phase, such as the second organic phase by spraying the emulsion or the part of the emulsion and the droplets, such as high density droplets into the second hydrophobic phase, such as the second organic phase and/or by injecting the emulsion or the part of the emulsion and the droplets, such as high density droplets into the second hydrophobic phase, such as the second organic phase. Alternatively, the lowering of the temperature of the emulsion obtained in step (ii) may be provided by spraying the emulsion or part of the emulsion and the droplets, such as high density droplets into cold or cooling air, or across cooled surfaces, such as a film or thin pipes.

Particularly, it has been found that when attempting to produce beads, such as high density beads in large scale the relatively slow cooling process employed in the prior art leads to an extensive formation of very large beads, aggregated beads and irregular particles. Thus, the inventors of the present invention found that when producing the beads, such as high density beads of the present invention the cooling should be performed very fast.

In an embodiment of the present invention the temperature of the emulsion and/or the droplets, such as high density droplets is reduced to a temperature below the gelation point of the material capable of gelation, such as the polymeric material within 3 minutes or less after receiving the external mechanical energy input, such as within 1 minute or less after receiving the external mechanical energy input, e.g. within 45 seconds or less after receiving the external mechanical energy input, such as within 30 seconds or less after receiving the external mechanical energy input, e.g. within 15 seconds or less after receiving the external mechanical energy input, such as within 10 seconds or less after receiving the external mechanical energy input, e.g. within 5 seconds or less after receiving the external mechanical energy input, such as within 1 seconds or less after receiving the external mechanical energy input, e.g. within 0.5 seconds or less after receiving the external mechanical energy input, such as within 0.1 seconds or less after receiving the external mechanical energy input, e.g. within 0.05 seconds or less after receiving the external mechanical energy input, such as within 0.01 seconds or less after receiving the external mechanical energy input, e.g. within 0.005 seconds or less after receiving the external mechanical energy input, such as within 0.001 seconds or less after receiving the external mechanical energy input, e.g. within 0.0005 seconds or less after receiving the external mechanical energy input.

In an embodiment of the method according to the invention in step (iii) the emulsion is subjected to means for gelation in order to obtain gelation of the material capable of gelation within 1 minute or less, such as within 30 seconds or less.

In an embodiment of the method according to the invention in step (iii) the temperature of the emulsion obtained in step (ii) is reduced to a temperature below the gelation point of the material capable of gelation within 5 seconds or less, such as within 1 second or less.

In an embodiment of the method according to the invention in step (iii) the temperature of the emulsion obtained in step (ii) is reduced to a temperature below the gelation point of the material capable of gelation within 0.5 seconds or less, such as within 0.05 seconds or less.

The particle size range and the average size of the resulting beads was shown to correlate with the amount of external mechanical energy applied to the first reactor and the residence time of the emulsion in the first reactor. Thus, in general, the higher the energy input the smaller the average size of the beads and the longer residence time of the emulsion in the first reactor the smaller the beads would also become (until a certain residence time was reached, where after the bead size was no longer becoming smaller at higher residence time). In order to obtain a high yield of beads having a particle diameter of less than e.g. 1 mm the residence time of the emulsion inside the first reactor whereto external energy is applied, should be at least one second and more preferably at least three seconds, while in order to have an optimal productivity of the manufacturing process the residence time is preferably to be kept below five minutes, more preferably below three minutes, even more preferably below one minute and most preferably below 30 seconds.

In an embodiment of the method according to the invention the external mechanical energy corresponds to at least 100 Watt/L, and in step (iii) the emulsion is subjected to means for gelation in order to obtain gelation of the material capable of gelation within 1 second or less.

Thus it has been shown that under these conditions there is an improved yield of beads with little or substantially no agglomeration and deformation within a size range particularly useful for chromatographic adsorption purposes.

In the present context the term "after receiving the external mechanical energy input" relates to the time from the emulsion and/or droplets, such as high density droplets of the emulsion leaves the localized zone of external mechanical energy input and is no longer affected by the external mechanical energy added.

The gelation point of the material capable of gelation, such as the polymeric material may vary greatly depending on the type of material capable of gelation, such as the polymeric material used or even within the same types of material capable of gelation, such as the polymeric materials just varying in molecular weight. Thus, in an embodiment of the present invention the material capable of gelation, such as the polymeric material is allowed to gel and droplets, such as high density droplets are formed when the temperature of the emulsion and/or the beads, such as high density beads obtained in step (ii) is reduced by 5° C. or more below the gelation point of the material capable of gelation, such as the polymeric material, such reduced by 10° C. or more below the gelation point of the material capable of gelation, such as the polymeric material, e.g. reduced by 15° C. or more below the gelation point of the material capable of gelation, such as the polymeric material, such reduced by 20° C. or more below the gelation point of the material capable of gelation, such as the polymeric material, e.g. reduced by 30° C. or more below the gelation point of the material capable of gelation, such as the polymeric material, such reduced by 40° C. or more below the gelation point of the material capable of gelation, such as the polymeric material, e.g. reduced by 50° C. or more below the gelation point of the material capable of gelation, such as the polymeric material.

In yet an embodiment of the present invention the temperature of the emulsion and/or the droplets, such as high density droplets obtained in step (ii) is reduced to a temperature of 70° C. or less, such as a temperature of 50° C. or less, e.g. to a temperature of 40° C. or less, such as a temperature of 30° C. or less, e.g. to a temperature of 20° C. or less, e.g. to a temperature of 10° C. or less, such as a temperature in the range of 1-70° C., e.g. to a temperature in the range of 10-50° C., such as a temperature in the range of 15-40° C., e.g. to a temperature in the range of 15-30° C.

Preferably the second hydrophobic phase, such as the second organic phase has a temperature of from about −10° C. to about 70° C., more preferably from about ±1 to 25° C., more preferably from about +5 to 20° C., more preferably from about +5 to 15° C., and most preferably from about 5° C. to about 10° C.

Preferably, the temperature of the emulsion and/or the droplets, such as high density droplets may be reduced to a temperature of 50° C. or less, such as 40° C. or less, e.g. 30° C. or less, such as 25° C. or less, e.g. 20° C. or less, such as 15° C. or less, e.g. 10° C. in 1 minute or less after receiving the external mechanical energy input, such as in 45 seconds or less after receiving the external mechanical energy input, e.g. in 30 seconds or less, after receiving the external mechanical energy input such as in 20 seconds or less after receiving the external mechanical energy input, e.g. in 10 seconds or less after receiving the external mechanical energy input, such as in 1 seconds or less after receiving the external mechanical energy input, e.g. in 0.5 seconds or less after receiving the external mechanical energy input, such as in 0.1 seconds or less after receiving the external mechanical energy input, e.g. in 0.05 seconds or less after receiving the external mechanical energy input, such as in 0.005 seconds or less after receiving the external mechanical energy input, e.g. in 0.0005 seconds or less after receiving the external mechanical energy input.

In the present context the term "gelation point" relates to the state where the melted material capable of gelation, such as the polymeric material in the liquid composition, such as the aqueous suspension changes from a melted liquid phase to a solid, hydrated phase (gel).

The terms "gelation" or "gelation point" may include freezing of the emulsion during the production process, e.g. by using spraying or other means of delivering the emulsion onto a rotating cold surface and subsequently scraping of the frozen emulsion.

After the emulsion and/or the droplets, such as high density droplets are cooled stabilised beads, such as high density beads are formed. The stabilised beads, such as high density beads may be separated from the first and/or second hydrophobic phase, such as the first and/or second organic phase and preferably the separated beads, such as high density beads may be stored in an aqueous, near neutral, buffer, such as pH 5 to pH 9 preferably at a temperature between 2 and 10° C.

When the emulsion, comprising the droplets, such as high density droplets of the density controlling core particle surrounded by the material capable of gelation, such as the polymeric material in the first hydrophobic phase, such as the first organic phase, is mixed with the second hydrophobic phase, such as the second organic phase a second mixture is formed. This second mixture comprises the stabilised beads, such as high density beads. The stabilised beads, such as high density beads (from step (iii)) may be separated from the first hydrophobic phase, such as the first organic phase and/or the second hydrophobic phase, such as the second organic phase.

In the present context the term "second mixture" relates to a mixture of the emulsion, comprising the high density droplets/beads and the first hydrophobic phase, such as the first organic phase, in combination with the second hydrophobic phase, such as the second organic phase.

In an embodiment of the invention the beads are isolated from the second hydrophobic phase by transfer from the stabilisation reactor to a beads isolation reactor.

In a preferred embodiment of the present invention the separation may be performed by subjecting the second mixture comprising the stabilised beads, such as high density beads to an aqueous environment, where the beads, such as high density beads are allowed to sediment. Preferably, the second mixture comprising the stabilised beads, such as high density beads and the second hydrophobic phase, such as the second organic phase is transferred to a bead isolation reactor. Preferably the aqueous environment is provided by addition of water or aqueous buffers, such as phosphate buffers, citrate buffers, acetate buffers at approximately neutral pH values. Then the particles are sedimented at the bottom of the isolation reactor from where they can be removed, e.g. through a valve, and the first and/or second hydrophobic phase, such as the first and/or second organic phase may be collected in the top of the isolation reactor from where the first and/or second hydrophobic phase, such as the first and/or second organic phase may be drained off. Preferably, the first and/or second hydrophobic phase, such as the first and/or second organic phase drained off may be recycled.

The separated and isolated beads may be further processed in a manner known per se in order to obtain a more uniform size or density thereof and/or in order to obtain chemical derivatisation according to the specific end-use thereof. Thus the separated and isolated beads may be subjected to size and/or density fractionation such as by sieving or flow sorting. Furthermore the separated and isolated beads may be derivatised in a manner known per se such as by chemical derivatisation, cross-linking, ligand immobilisation etc.

In an embodiment the first hydrophobic phase or a proportion thereof is recycled to the first reactor and/or the second hydrophobic phase or a proportion thereof is recycled to the stabilisation reactor.

An additional water separation tank may be connected to the isolation reactor before the first and/or second hydrophobic phase, such as the first and/or second organic phase is in a condition to be recycled.

Occasionally, the first and/or second hydrophobic phase, such as the first and/or second organic phase needs to be filtered or centrifuged or treated otherwise (to separate water and organic phase efficiently) before being in condition for being re-used for the next production of beads, such as high density beads.

In an embodiment of the present invention the separated beads, such as high density beads may be washed with a washing solution. Preferably, the washing solution may be selected from water; aqueous buffers, such as phosphate buffers, citrate buffers, acetate buffers at approximately neutral pH values. The buffers may comprise detergents such as SDS to remove any remaining first and/or second hydrophobic phase, such as the first and/or second organic phase.

The beads, such as high density beads may also be washed with organic solvents such as ethanol, isopropyl alcohol, ethylacetate and other solvents that may be solubilising the organic phase employed.

As an alternative and/or supplement to the thermal gelation described above the means for gelation comprises a chemical gelation.

In an embodiment of the invention the means for gelation comprises thermal gelation by reducing the temperature of the emulsion from above the gelation point to a temperature below the gelation point; and/or the means for gelation comprises means for chemical gelation.

In an embodiment of the invention gelation may be obtained by chemical gelation alone or in combination with thermal gelation.

By the term "chemical gelation" in the present context is meant the formation of a gel by means of chemical formation of bonds in the material capable of gelation. Chemical gelation includes, but is not limited to covalent or non-covalent cross-linking, addition of metal ions in order to form stable three-dimensional networks, polymerisation, chemically induced conformational change such as conformational changes coursed by changes in pH, charge and/or charge density, by complex formation or by chemical elimination or addition of certain chemical groups (e.g. hydrolysis of esters or amidation of carboxylic acids).

In an embodiment of the invention the means for chemical gelation comprises means for covalent cross-linking.

In an embodiment of the invention the means for covalent cross-linking comprises, but is not limited to, reaction with homo- or hetero-bifunctional reagents, such as bis-epoxides (e.g. butandiol-diglycidylether), di-aldehydes (e.g. glutaric dialdehyde), chloro-hydrines (e.g epichlorohydrine and allyl-bromide).

In an embodiment of the invention the means for chemical gelation comprises addition of metal ions, the metal ions creating complexes with the material capable of gelation and non-covalent cross-links leading to gelation. Non-limiting examples of metal-ions comprises calcium, magnesium, aluminium and zinc ions.

The System

The inventors of the present invention surprisingly provided a system and a method which made it possible to provide beads, such as high density beads in a continuous method/system at an industrial scale.

In a preferred embodiment of the present invention a system comprising a first reactor is provided. Said first reactor comprises:
(i) means for emulsifying (a) a liquid composition comprising a material capable of gelation; and (b) a first hydrophobic phase, by addition of external mechanical energy to create an emulsion comprising individual droplets comprising the material capable of gelation in the first hydrophobic phase (wherein the material capable of gelation provides a discontinuous phase and the first hydrophobic phase provides a continuous phase); and
(ii) at least one outlet, said outlet transferring the emulsion from the first reactor to a stabilisation reactor for stabilising the droplets.

Preferably, the stabilisation of the droplets, such as the high density droplets may be a flash stabilisation. In the present context the term "flash stabilisation" relates to an immediate stabilisation of the droplets, such as the high density droplets, preferably, a stabilisation in 5 minutes or less as defined previously in the specification.

In an embodiment of the present invention the first reactor may comprise means for controlling the temperature of the aqueous suspension and/or the first hydrophobic phase, such as the first organic phase. In another embodiment the means for controlling the temperature may be used directly at the liquid composition, such as the aqueous suspension and/or the first hydrophobic phase, such as the first organic phase before they are added to the first reactor or the means for controlling the temperature may form part of the first reactor controlling the temperature of the first mixture and/or the emulsion.

Preferably, the stabilisation reactor is capable of stabilising the emulsion and the droplets, such as the high density droplets by subjection to means for gelation, such as by reducing the temperature of the emulsion and the beads, such as high density beads obtained in step (i) to a temperature below the gelation point of the material capable of gelation, such as the polymeric material within 5 minutes or less, as mentioned previously in the specification. The time it takes for reducing the temperature, of the emulsion and the droplets, such as the high density droplets obtained in step (i) to a temperature below the gelation point of the material capable of gelation, such as the polymeric material, may be determined from the time the emulsion and the droplets, such as the high density droplets leaves the external mechanical energy source provided in the first reactor until said emulsion and said droplets, such as said high density droplets reaches the stabilisation reactor (and preferably are contacted with the second hydrophobic phase, such as the second organic phase) and is sufficiently cooled to allow the material capable of gelation, such as the polymeric material to gel and thereby being stabilised. In an embodiment of the present invention the stabilisation reactor comprises a second hydrophobic phase, such as the second organic phase.

In an embodiment of the present invention the first reactor may comprise at least one inlet for adding the aqueous suspension comprising the density controlling core particle, if any and the material capable of gelation, such as the polymeric material to first reactor.

In yet an embodiment of the present invention the first reactor may comprise at least one inlet for adding the first hydrophobic phase, such as the first organic phase to the first reactor. Alternatively the first reactor may comprise at least one inlet for adding the first mixture comprising the density controlling core particle, if any the material capable of gelation, such as the polymeric material and first hydrophobic phase, such as the first organic phase.

The first mixture may be subjected to means for creating a "pre-emulsion" before entering into the first reactor. In the present context the term "pre-emulsion" relates to a blending of (a) the aqueous suspension, comprising the density controlling core particle, if any and the material capable of gelation, such as the polymeric material, and (b) the first hydrophobic phase, such as the first organic phase creating an initial emulsion which must be subjected to further emulsification.

In an embodiment of the invention the stabilisation reactor is further connected to a bead isolation reactor.

In an embodiment of the invention the beads isolation reactor comprises an outlet for the removal of stabilised beads and/or a first recycle outlet for transferring the first hydrophobic phase back to the first reactor and/or a second recycle outlet for transferring the second hydrophobic phase back to the stabilisation reactor.

The stabilisation reactor may be further connected to a bead isolation reactor. The stabilisation reactor may comprise at least one outlet, said outlet is transferring the second mixture and the beads, such as high density beads from the stabilisation reactor to the bead isolation reactor for separating the beads, such as high density beads from the first and/or second hydrophobic phase, such as the first and/or second organic phase.

In an embodiment of the invention the beads isolation reactor comprises an aqueous environment.

Said bead isolation reactor may comprise an aqueous environment, such as water, whereby the beads, such as high density beads may be removed, preferably, continuously removed, from the bottom of the bead isolation reactor, e.g. through a valve and the first and/or second hydrophobic phase, such as the first and/or second organic phase may move to the top of the aqueous phase and subsequently removed and optionally recycles as first and/or second hydrophobic phase, such as the first and/or second organic phase for the following production of beads, such as high density beads.

In an embodiment of the present invention the bead isolation reactor comprises one outlet for the removal of beads, such as high density stabilised bead(s) and/or a first recycle outlet for transferring the first hydrophobic phase, such as the first organic phase back to the first reactor and/or a second recycle outlet for transferring the second hydrophobic phase, such as the second organic phase back to the stabilisation reactor.

The Materials and the Products

In the present context the term "first hydrophobic phase, such as the first organic phase" relates to a hydrophobic phase with a temperature above the melting point of the material capable of gelation, such as the polymeric material, as defined above, and with the physical properties of being repelled from water and/or the material capable of gelation, such as the polymeric material. Alternatively, an inorganic phase could be used if just this inorganic phase is hydrophobic and does not mix with water and/or the material capable of gelation, such as the polymeric material.

In a preferred embodiment of the present invention the first hydrophobic phase, such as the first organic phase is an oil, in particular a mineral oil.

In an embodiment of the present invention the first hydrophobic phase, such as the first organic phase is a vegetable oil or a silicone oil.

The first hydrophobic phase, such as the first organic phase may comprise a surfactant and/or an emulsifier. The optimum surfactant/emulsifier and the optimum concentration of said surfactant/emulsifier will be dependent on material capable of gelation, such as the polymeric material (and the concentration of the material capable of gelation, such as the polymeric material) used and probably some experimentation may be needed to determine this optimum. Generally the surfactant/emulsifier may be used in concentrations of from about 0.001% to about 10%, preferably from about 0.01% to about 5% by total weight of the emulsion.

In an embodiment of the present invention the first hydrophobic phase, such as the first organic phase does not comprise a surfactant or an emulsifier.

In the present context the term "second hydrophobic phase, such as the second organic phase" relates to a hydrophobic phase with a temperature below the gelation point of the material capable of gelation, such as the polymeric material, as defined above, and with the physical properties of being repelled from water and/or the material capable of gelation, such as the polymeric material. Alternatively, an inorganic phase could be used if just this inorganic phase is hydrophobic and does not mix with water and/or the material capable of gelation, such as the polymeric material.

In a preferred embodiment of the present invention the second hydrophobic phase, such as the second organic phase is an oil, in particular a mineral oil.

In an embodiment of the present invention the second hydrophobic phase, such as the second organic phase is a vegetable oil or a silicone oil.

Preferably, the second hydrophobic phase, such as the second organic phase does not comprise a surfactant and/or an emulsifier.

In a preferred embodiment of the present invention the first and the second hydrophobic phase, such as the first and the second organic phase are of the same chemical origin. Preferably, both the first and the second hydrophobic phase, such as the first and the second organic phase may be an oil, in particular a mineral oil or a vegetable oil or a silicone oil.

In the present context the terms "high density bead(s)" and "stabilised high density bead(s)" are used interchangeably and relates to a stabilised solid bead comprising a density controlling core particle surrounded by a material capable of gelation, such as the polymeric material produced according to the present invention. Preferably, the solid high density beads are in the form of a gel. In a preferred embodiment the high density bead(s) has a density of 1.5 g/mL or more, such as a density of 1.6 g/mL or more, e.g. a density of 1.7 g/mL or more, such as a density of 1.8 g/mL or more, e.g. a density of 1.9 g/mL or more, such as a density of 2.0 g/mL or more, e.g.

a density of 2.1 g/mL or more, such as a density of 2.2 g/mL or more, e.g. a density of 2.3 g/mL or more, such as a density of 2.4 g/mL or more, e.g. a density of 2.5 g/mL or more, such as a density of 2.6 g/mL or more, e.g. a density of 2.7 g/mL or more, such as a density of 2.8 g/mL or more, such as a density of 2.9 g/mL or more, e.g. a density of 3.0 g/mL or more, such as a density of 3.5 g/ml or more, e.g. a density of 4.0 g/ml or more, such as a density of 5 g/ml or more, e.g. a density of 7 g/ml or more, such as a density of 10 g/ml or more, e.g. a density of 15 g/ml or more.

The density of the high density bead(s) is meant to describe the density of the individual bead(s) in its fully solvated (e.g. hydrated) state as opposed to the density of a dried adsorbent.

It may be preferred that the beads, such as high density bead(s) produced according to the present invention are suitable for stabilised fluidised bed adsorption. A "stabilised fluidised bed" may be defined as a fluidised bed in which there is a low degree of back-mixing of the beads, such as high density beads as a consequence of the movement of each bead being restricted to move within a limited volume of the total bed volume. This means that each bead has a low extent of axial dispersion and does not have the same probability of being found at any position within the confined space of the fluidised bed. A stabilised bed thus may be characterised as having a non-homogenous composition of the beads, such as high density beads making up the entire fluidised bed as the absence of back-mixing precludes mixing of mutually heterogeneous zones of the bed.

Stabilization of the fluidised bed may be obtained by use of beads, such as high density beads having a well-defined size distribution and/or a well-defined density distribution together with a column designed to give an even liquid flow distribution. The stability arises when the adsorbent particles make up a so called classified (or stratified) bed where the larger and/or most dense beads, such as high density beads are positioned closer to the bottom of the bed and the smaller and/or less dense beads, such as high density beads are positioned closer to the top of the bed. The bed expands as the adsorption particles are lifted by the upward liquid flow through the column.

The size distribution of the beads, such as high density beads according to the invention is preferably defined so that more than 90% of the beads are found between 20-500% of the mean bead diameter, more preferable between 50-200% of the mean bead diameter, most preferable between 50-150% of the mean bead diameter.

In an embodiment of the present invention the size of the beads, such as high density beads is 1000 µm or less, such as 750 µm or less, e.g. 600 µm or less, such as 500 µm or less, e.g. 250 µm or less, such as 200 µm or less, e.g. 150 µm or less, such as 100 µm or less, e.g. 75 µm or less, such as in the range of 1-1000 µm, e.g. in the range of 1-750, such as in the range of 1-500 µm, e.g. in the range of 1-250, such as in the range of 1-200 µm, e.g. in the range of 1-150, such as in the range of 20-160 µm, e.g. in the range of 20-140, such as in the range of 20-40 µm, e.g. in the range of 40-160 such as in the range of 40-120 µm.

In an embodiment of the present invention the high density beads has a density of 2.0 g/ml or more, such as a density of 2.1 g/ml or more, e.g. a density of 2.2 g/ml or more, such as a density of 2.3 g/ml or more, e.g. a density of 2.4 g/ml or more, such as a density of 2.5 g/ml or more, e.g. a density of 2.6 g/ml or more, such as a density of 2.7 g/ml or more, e.g. a density of 2.8 g/ml or more, such as a density of 2.9 g/ml or more, e.g. a density of 3.0 g/ml or more, such as a density of 3.5 g/ml or more, e.g. a density of 4.0 g/ml or more and a bead size of 250 µm or less, such as at most 200 µm, e.g. at most 150 µm, such as at most 120 µm, e.g. at most 100 µm, such as at most 90 µm, e.g. at most 75 µm, such as at most 50 µm, e.g. in the range of 1-250 µm, such as 10-160 µm, e.g. 30-140, such as 40-120, e.g. 40-50 µm, such as 20-40, e.g. 40-140 µm, such as 40-160.

In yet an embodiment of the present invention the beads, such as high density beads have a mean bead size of 200 µm or less such as a mean bead size of 180 µm or less, e.g. a mean bead size of 160 µm or less, such as at most 140 µm, e.g. at most 120 µm, such as at most 100 µm, e.g. at most 90 µm, such as at most 80 µm, e.g. at most 70 µm, such as at most 60 µm, e.g. at most 50 µm, such as at most 40 µm, e.g. at most 30 µm, such as at most 20 µm, e.g. at most 10 µm.

In an embodiment of the present invention the high density beads has a density of 2.0 g/ml, such as a density of 2.1 g/ml or more, e.g. a density of 2.2 g/ml or more, such as a density of 2.3 g/ml or more, e.g. a density of 2.4 g/ml or more, such as a density of 2.5 g/ml or more, e.g. a density of 2.6 g/ml or more, such as a density of 2.7 g/ml or more, e.g. a density of 2.8 g/ml or more, such as a density of 2.9 g/ml or more, e.g. a density of 3.0 g/ml or more, such as a density of 3.5 g/ml or more, e.g. a density of 4.0 g/ml or more and a mean bead size of 200 µm or less such as a mean bead size of 180 µm or less, e.g. a mean bead size of 160 µm or less, such as at most 140 µm, e.g. at most 120 µm, such as at most 100 µm, e.g. at most 90 µm, such as at most 80 µm, e.g. at most 70 µm, such as at most 60 µm, e.g. at most 50 µm, such as at most 40 µm, e.g. at most 30 µm, such as at most 20 µm, e.g. at most 10 µm.

Preferably the high density beads has a density of at least 1.5 g/ml and a mean diameter in the range of 10-180 µm, such as a density of at least 2.0 g/ml and a mean diameter in the range of 20-180 µm, such as a density of at least 2.1 g/ml and a mean diameter in the range of 20-180 µm, e.g. a density of at least 2.2 g/ml and a mean diameter in the range of 20-180 µm, such as a density of at least 2.3 g/ml and a mean diameter in the range of 20-180 µm, e.g. a density of at least 2.4 g/ml and a mean diameter in the range of 20-180 µm, such as a density of at least 2.5 g/ml and a mean diameter in the range of 20-180 µm, e.g. a density of at least 2.6 g/ml and a mean diameter in the range of 20-180 µm, such as a density of at least 2.7 g/ml and a mean diameter in the range of 20-180 µm, e.g. a density of at least 2.8 g/ml and a mean diameter in the range of 20-180 µm, such as a density of at least 2.9 g/ml and a mean diameter in the range of 20-180 µm and most preferred a density of more than 3.0 g/ml and a mean diameter in the range of 20-40 µm.

The beads, such as high density bead(s) used according to the invention may be at least partly permeable to the biomolecular substance to be isolated in order to ensure a significant binding capacity in contrast to impermeable bead(s) that can only bind the target molecule on its surface resulting in relatively low binding capacity.

The high density bead(s) may be either of the conglomerate type, as described in WO 92/00799, having at least two density controlling core particles surrounded by a porous material, or of the pellicular type having a single density controlling core particle surrounded by a porous material.

In the present context the term "conglomerate type" relates to high density beads of a particulate material, which comprises several density controlling core particles of different types and/or sizes, held together by the material capable of gelation, such as the polymeric material, e.g. agarose.

In the present context the term "pellicular type" relates to high density beads, wherein each high density bead consists of only one density controlling core particle coated with a layer of the material capable of gelation, such as the polymeric material.

Accordingly the term "density controlling core particle" relates to either a pellicular core, comprising a single density controlling core particle or it relates to a conglomerate core comprising more than one density controlling core particles. Furthermore, the density controlling core particle is present inside the high density beads. The density controlling core particle or density controlling core particles may be incidental distributed within the material capable of gelation, such as the polymeric material and is not limited to be located in the centre of the high density beads.

In an embodiment of the present invention the density controlling core particle may be a single particle or an aggregate of two or more density controlling core particles. Preferably, the high density beads may comprise more than one density controlling core particle.

The density controlling core particles constitutes typically of at most 90% of the total volume of the high density bead, such as at most 75%, e.g. at most 50%, such as at most 25%, preferably at most 15%.

Preferably, the density controlling core particle may be non-porous. In an embodiment of the present invention the non-porous density controlling core particle may be selected from the group consisting of inorganic compounds, metals, heavy metals, elementary non-metals, metal oxides, non metal oxides, metal salts and metal alloys.

Preferably, the non-porous density controlling core particle may be derived from a metal and may be selected from the group consisting of metal silicates metal borosilicates; ceramics including titanium diboride, titanium carbide, zirconium diboride, zirconium carbide, tungsten carbide, silicon carbide, aluminum nitride, silicon nitride, titanium nitride, yttrium oxide, and molybdenum disilide; metal oxides and sulfides, including aluminum, titanium, vanadium, chromium, zirconium, hafnium, manganese, iron, cobalt, nickel, copper and silver oxide; non-metal oxides; metal salts, including barium sulfate; metallic elements, including tungsten, zirconium, titanium, hafnium, vanadium, chromium, manganese, iron, cobalt, nickel, indium, copper, silver, gold, palladium, platinum, ruthenium, osmium, rhodium and iridium, and alloys of metallic elements, such as alloys formed between said metallic elements, e.g. stainless steel.

Preferred non-porous core materials are tungsten carbide, tungsten, steel and titanium beads such as stainless steel beads.

In a preferred embodiment of the present invention the density controlling core particle may have a density of 3 g/mL or more, such as a density of 3.5 g/mL or more, e.g. a density of 4 g/mL or more, such as a density of 5 g/mL or more, e.g. a density of 7.5 g/mL or more, such as a density of 10 g/mL or more, e.g. a density of 12 g/mL or more, such as a density of 15 g/mL or more, e.g. a density of 17 g/mL or more, such as a density of 20 g/mL or more.

The material capable of gelation, such as the polymeric material may be used as a means for covering and keeping multiple (or a single) density controlling core particles together and as a means for binding an adsorbing ligand.

The term "material capable of gelation" comprises both polymeric and monomeric materials. As examples of monomeric materials may be mentioned acrylates, such as acrylamide; di-amines such hexane-diamine; bis-acyl chlorides, such as phthalic dichloride; vinyl chlorides The term "polymeric material" relates to a material that is liquefied when heated above the melting point of the polymeric material and is gelling such as when cooled below the gelling point of the polymeric material. The skilled person knows that melting point and gelling point of the polymeric material is not always the same. The polymeric material may be capable of creating cross links to form a network and thereby create a gel. The polymeric material may be used for any kind of crosslinking if desired by any of the chemistries commonly used in the industry to crosslink materials containing multiple hydroxyl groups, such as polysaccharide beads, these chemistries being as non-limiting examples, epichlorohydrin or other multifunctional epoxy compounds, various bromyl chemistries or other multifunctional halides; formaldehyde, gluteraldehyde and other multifunctional aldehydes, bis(2-hydroxy ethyl)sulfone, dimethyldichlorosilane, dimethylolurea, dimethylol ethylene urea, diisocyanates or polyisocyanates and the like.

In an embodiment of the invention the polymeric material is selected from the group consisting of natural or synthetic organic polymers.

The polymeric material may be sought among certain types of natural or synthetic organic polymers, typically selected from i) natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, chitosans, hydroxy starches, hydroxypropyl starches, carboxymethyl starches, hydroxyethyl celluloses, hydroxypropyl celluloses, and carboxymethyl celluloses; ii) synthetic organic polymers and monomers resulting in polymers, including acrylic polymers, polyamides, polyimides, polyesters, polyethers, polymeric vinyl compounds, polyalkenes, and substituted derivatives thereof, as well as copolymers comprising more than one such polymer functionally, and substituted derivatives thereof; and iii) mixture thereof.

In an embodiment of the invention the natural or synthetic organic polymers are selected from i) natural and synthetic polysaccharides and other carbohydrate based polymers, including agar-agar, alginate, carrageenan, gelatine, guar gum, gum arabic, gum ghatti, gum tragacanth, karaya gum, locust bean gum, xanthan gum, agaroses, celluloses, pectins, mucins, dextrans, starches, heparins, chitosans, hydroxy starches, hydroxypropyl starches, carboxymethyl starches, hydroxyethyl celluloses, hydroxypropyl celluloses, and carboxymethyl celluloses; ii) synthetic organic polymers and monomers resulting in polymers, including acrylic polymers, polyamides, polyimides, polyesters, polyethers, polymeric vinyl compounds, polyalkenes, and substituted derivatives thereof, as well as copolymers comprising more than one such polymer functionally, and substituted derivatives thereof; and iii) mixtures thereof.

In an embodiment of the invention the natural or synthetic organic polymers are selected from agar-agar, gelatine, agaroses and acrylic polymers.

In a preferred embodiment of the present invention the polymeric material may be a polysaccharide. Preferably, the polysaccharide is agar-agar or agarose.

In an embodiment of the invention the natural or synthetic organic polymer is agarose.

As is common in the manufacturing of beads, various additives can be used to enhance production or add a property to the beads and the same additives may be used in the production of the beads, such as high density beads according to the present invention.

One class of additives comprises volatile organics, miscible with the solution. Examples are monohydric alcohols such as methanol, ethanol, and propanols. These can be used up to concentrations that give a slightly cloudy solution. Higher amounts of these alcohols can cause precipitation of the material capable of gelation, such as the polymeric material. Miscible ketones such as acetone can also be used, but care must be used as the solubility of material capable of gelation, such as the polymeric material is less in ketone-water mixtures. Any mixture of two or more of these materials is also contemplated A further class of additives comprises non-volatile miscible organics. Non-limiting examples of these included glycerine, ethylene glycol, methyl pentane diol, diethylene glycol, propylene glycol, triethylene glycol, the methyl, ethyl, or n-butyl ethers of ethylene glycol, the dimethyl or diethyl ethers of ethylene glycol, ethylene glycol dimethyl ether acetate ethylene glycol diethyl ether acetate, diethylene glycol methyl ether, diethylene glycol ethyl ether, diethylene glycol n-butyl ether, diethylene glycol dimethyl ether, diethylene glycol diethyl ether, diethylene glycol dimethyl ether acetate, diethylene glycol diethyl ether acetate, N-methyl morpholine, N-ethyl morpholine, and the like. Polyethylene glycols of low molecular weight are also examples of materials that are in this class. Any mixture of two or more of these materials is also contemplated Another class of additives comprises water-soluble polymers, which includes, polyvinyl pyrrolidone, polyvinyl alcohol, polyethylene glycols, dextrans, and water-soluble polyacylamides, including substituted polyacylamides, such as polydimethylacrylamide. These polymeric additives can be used as blends with the polymeric material in the initial dissolution step, or they can be dissolved in the solution after the addition and dissolution of the polymeric material. Care must be taken not to add an excessive amount of polymer, as coagulation of the aqueous suspension may occur. Ratios of polymer to polymeric material of from about 0.1 to 10% are preferred. Preferred polymers are polyvinyl alcohol, dextrans and polyacrylamides

PREFERRED EMBODIMENTS OF THE PRESENT INVENTION

In an embodiment the present invention may be based on a continuous high shear emulsion process employing an aqueous polymeric material (e.g. agarose) solution surrounding a density controlling core particle as the discrete phase and a first organic phase, a water immiscible liquid, as the continuous phase (e.g. mineral oil).

An aqueous solvent (e.g. water), polymeric material (e.g. agarose) and density controlling core particles are thoroughly mixed to form an aqueous suspension of density controlling core particles and polymeric material powder in the aqueous solvent. The aqueous suspension may be heated, e.g. by pumping it through a heat exchanger heating the aqueous suspension above the melting point of the polymeric material. At the same time the first organic phase may be heated, preferably to similar temperatures as the aqueous suspension. In some cases the same heat exchanger may be used to heat a continuous stream of first organic phase, e.g. mineral oil, to the same temperature as the aqueous suspension.

Upon leaving the heat exchanger the aqueous suspension and the hot first organic phase may be mixed in an inline mixer (mechanical/dynamic mixer) instantly forming an emulsion of the aqueous suspension and the first organic phase.

When leaving the inline mixer chamber the emulsion may immediately be brought in contact with a continuous and vigorous stream of cold second organic phase, a water immiscible liquid (e.g. mineral oil), instantly bringing the temperature of the emulsion below the gelling temperature of the polymeric material and instantly stabilising the high density droplets forming the high density beads.

The high density beads may continuously be separated from the first and/or second organic phase in a bead isolation reactor (e.g. a water tank), whereby the produced high density beads are concentrated in a water phase and the first and/or second organic phase separates to the top phase. From here the first and/or second organic phase may be continuously withdrawn and recycled, or a part of it may be recycled, as the first organic phase to provide the emulsion as described above and/or, cooled and recycled, or a part of it may be cooled and recycled, as a vigorous stream of cold second organic phase. The high density beads may be collected from the bottom of the bead isolation reactor by draining through a valve. Following a production session the used first and/or second organic phase may be filtered and re-used for the next production of high density beads.

The high density beads may be worked up from the water phase contaminated with first and/or second organic phase by fluidised bed washing with aqueous detergent and sieving on appropriate meshes.

An embodiment of the invention is a method for producing high density agarose beads having a density of 2.0 g/ml or more and comprising tungsten carbide as a density controlling core particle surrounded by agarose as polymeric material, said method comprising the steps of:
  (i) adding (a) an aqueous suspension comprising tungsten carbide and the agarose; and (b) a mineral oil to a first reactor;
  (ii) subjecting the aqueous suspension and the mineral oil, to means for emulsification by addition of external mechanical energy creating an emulsion comprising individual high density droplets comprising tungsten carbide surrounded by agarose in the mineral oil (wherein the tungsten carbide surrounded by agarose provides a discontinuous phase and the mineral oil provides a continuous phase);
  (iii) stabilising the high density droplets by transferring the emulsion from the first reactor to a stabilisation reactor wherein the temperature of the emulsion obtained in step (ii) is reduced to a temperature below the gelation point of the agarose within 5 seconds or less, and the high density beads are formed,
wherein steps (i) and/or (ii) are conducted at a temperature above the gelation point of the agarose.

Features that May Influence the Size of the Beads, Such as High Density Beads

The concentration of the material capable of gelation, such as the polymeric material (e.g. agarose) in the final product may be the same as the concentration of the material capable of gelation, such as the polymeric material used for making the initial aqueous suspension comprising the density controlling core particle, if any and the material capable of gelation, such as the polymeric material. In an embodiment of the present invention the particle size of the produced beads, such as high density bead population may be determined by the mixing speed of the inline mixer (mechanical/dynamic mixer) producing the hot emulsion.

In yet an embodiment of the present invention the bead size distribution and/or the density of the produced beads, such as high density bead population may be determined by the flow rate of the first mixture of density controlling core particle, material capable of gelation, such as the polymeric material and first hydrophobic phase, such as the first organic phase through the inline mixer (mechanical/dynamic mixer).

In a further embodiment of the present invention the particle size distribution and/or the density of the produced beads, such as high density bead population may be determined by the viscosity of the melted material capable of gelation, such as the polymeric material and the density controlling core particle, if any to be emulsified. Thus, the concentration of the material capable of gelation, such as the polymeric material and the density controlling core particle, if any may have an influence on the resulting size and/or density of the beads, such as high density beads.

In an embodiment of the present invention the viscosity of the first hydrophobic phase, such as the first organic phase may influence the size distribution and/or the density of the beads, such as high density beads.

In another embodiment of the present invention it is not necessary to pre-hydrolyse the material capable of gelation, such as the polymeric material in order to reduce the viscosity.

Preferably, the size range of the final beads, such as high density beads is controlled by wet sieving.

In an embodiment of the present invention the size distribution of the beads, such as high density beads may be influenced by at least two of the above mentioned features (mixing speed; flow rate; viscosity of the material capable of gelation, such as the polymeric material and the density controlling core particle, if any; and the viscosity of the first hydrophobic phase, such as the first organic phase), such as at least 3 of the above mentioned features, e.g. 4 of the above mentioned features.

Description of FIG. 1

FIG. 1 demonstrating the method and the system of the present invention may be further presented in the following non-limiting description:

The material capable of gelation, such as the polymeric material, preferably agarose and an aqueous liquid (preferably water), and the density controlling core particle, preferably non-porous materials, such as tungsten carbamide, are poured into a tank or a reaction vessel (1). The tank (1) is heated to a temperature above the melting point of the material capable of gelation, such as the polymeric material, preferably in the range of 40-120° C., more preferably in the range of 60-95° C., whereby the material capable of gelation, such as the polymeric material is liquefied and the melted and liquefied material capable of gelation, such as the polymeric material starts surrounding the density controlling core particle and an aqueous suspension of the density controlling core particle in the material capable of gelation, such as the polymeric material may be formed.

A first hydrophobic phase, such as the first organic phase, preferably an oil, such as a mineral oil, is poured into another tank (2). This tank (2) may or may not be heated, if heated then preferably to a temperature similar to the temperature of the tank or the reaction vessel (1).

By the action of a pump the hot aqueous suspension, provided in tank or reaction vessel (1), may be transferred to a heat exchanger (3), heating or keeping the temperature of the hot aqueous suspension. At the same time a pump transfers the hot first hydrophobic phase, such as the first organic phase to the heat exchanger (3). The two hot streams may meet and be mixed in (or just before) the heat exchanger (3). In the case the first hydrophobic phase, such as the first organic phase is cold the first hydrophobic phase, such as the first organic phase is transferred to the heat exchanger (3) and then subsequently mixed with the hot aqueous suspension before entering a first reactor (4) comprising a localized zone of external mechanical energy input. Preferably the first reactor (4) is in the form of a mechanical mixer, such as an in-line mixer, having a localized zone of external mechanical energy input. Preferably, the ratio between the hot aqueous suspension and the hot first hydrophobic phase, such as the first organic phase is in the range of 1:1-1:20, more preferably, in the range of 1:3-1:4.

The first mixture (comprising the hot aqueous suspension and the hot first hydrophobic phase, such as the first organic phase) is transferred to the first reactor (4) where the first mixture is subjected to the localized zone of external mechanical energy input, preferably by adding a mechanical energy of at least 10 Watt/L reactor volume and an emulsion comprising droplets, such as high density droplets (of density controlling core particles surrounded by the material capable of gelation, such as the polymeric material) in the first hydrophobic phase, such as the first organic phase, is produced.

The emulsion may be transferred from the first reactor (4) to a stabilisation reactor (5). This stabilisation reactor (5) comprises a second hydrophobic phase, such as the second organic phase, preferably oil, such as an mineral oil, and the temperature of this second hydrophobic phase, such as the second organic phase is preferably from about −10° C. to about 70° C., more preferably from about +5 to 20° C. This contact between the emulsion from the first reactor (4) and the cold second hydrophobic phase, such as the second organic phase in the stabilisation reactor (5) causes the emulsion to be cooled within 5 minutes, preferably within 1.0 minute or less, more preferably within 1 second or less, even more preferably, within 0.05 seconds or less, and the material capable of gelation, such as the polymeric material starts to gel and the droplets, such as the high density droplets present in the hot emulsion are stabilised whereby stable beads, such as high density beads are formed. This mixture of the emulsion, the stable beads, such as high density beads and the second hydrophobic phase, such as the second organic phase forms a second mixture.

The second mixture is transferred to a bead isolation reactor (6). Preferably the bead isolation reactor (6) comprises an aqueous environment, preferably water, where the stable beads, such as high density beads are sedimented at the bottom of the bead isolation reactor (6) and the first and/or the second hydrophobic phase, such as the first and/or second organic phase may be isolated at the top of the aqueous environment. Preferably the stable beads, such as high density beads may be obtained from a valve at the bottom of the bead isolation reactor (6), preferably the stable beads, such as high density beads may be continuously obtained from said valve. The first and/or the second hydrophobic phase, such as the first and/or second organic phase at the top of the aqueous environment may be transferred from the bead isolation reactor (6) through a recycling system (9) back to the tank (2) comprising the first hydrophobic phase, such as the first organic phase and/or returning the second hydrophobic phase, such as the second organic phase to the stabilisation reactor (5) to be re-used.

Optionally, a water separation tank (7) may be introduced to remove water which accidentally appears in the first and/or the second hydrophobic phase, such as the first and/or second organic phase obtained for the top of the aqueous environment in the bead isolation reactor (6).

Furthermore, a heat exchanger (8) for cooling the first and/or the second hydrophobic phase, such as the first and/or second organic phase obtained from the water separation tank (7) may, as an option, be introduced to give the first and/or the second hydrophobic phase, such as the first and/or second organic phase, in particular the second hydrophobic phase, such as the second organic phase the correct temperature before being re-used in the stabilisation reactor (5).

In this way a continuous system/method for producing beads, such as high density beads are provided and the present method/system is capable of providing at least 5 kg of beads, such as high density beads per hour.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Production of high density agarose beads according to the invention—particle size of beads as a function of energy input
Experimental Setup 3.6 kg agarose powder (D3, Hispanagar, Spain) was suspended in 90 L demineralised water at room temperature under continuous mixing with a paddle stirrer in a 120 L stainless steel tank. To the well-mixed agarose/water suspension was further added 158 kg tungsten carbide powder (XLWC100, Chaozhou Xianglu Tungsten Industry, China, average particle size 9-11 micron).

Another stainless steel tank (500 L) was filled with White oil (SP, Sunoco, Belgium).

The two stainless steel tanks were connected to two peristaltic pumps (VF10/VF15, Verderflex, Germany) as illustrated in FIG. 1. The agarose/tungsten carbide suspension was heated in the stainless steel tank to 92° C. under constant and vigorous mixing, whereby the agarose was melted to create a viscous aqueous suspension of 10% v/w tungsten carbide powder in a 4% w/w melted agarose solution. The melted agarose/tungsten carbide suspension was pumped through an insulated 8 mm ID stainless steel pipe to a Y-connection connecting the flow of hot agarose/tungsten carbide suspension with the flow of mineral oil also heated to about 90° C. by flowing through a heat exchanger. The melted agarose/tungsten carbide suspension was pumped at a flow rate of 0.3 L/min and the hot mineral oil was pumped at a flow rate of 1.4 L/min giving a ratio of agarose in mineral oil of 1:4.7 and a combined total flow of hot fluids of 1.7 L/min. The combined hot fluids were introduced through the bottom port into a L4RT mechanical mixer (from Silverson Machines Ltd, UK) fitted with the corresponding In-line Assembly (part no. VF 1817) comprising a Standard Emulsor Screen (part no. VF 1819). The L4RT mixer was set to a mixing speed of 6000 RPM. The mixing chamber (corresponding to the "first reactor" where the external energy input is localized) wherein the emulsification is taking place has a liquid filling volume of approx. 0.070 L. Since the total flow of hot fluids is 1.7 L/min. the mixing chamber holding time inside the mixing chamber is approx. 0.07/1.7 min. which corresponds to approximately 0.04 min. or approx. 2.5 seconds. The time the emulsion spends in the mixing chamber may be called the mixing chamber holding time.

Figure 4:
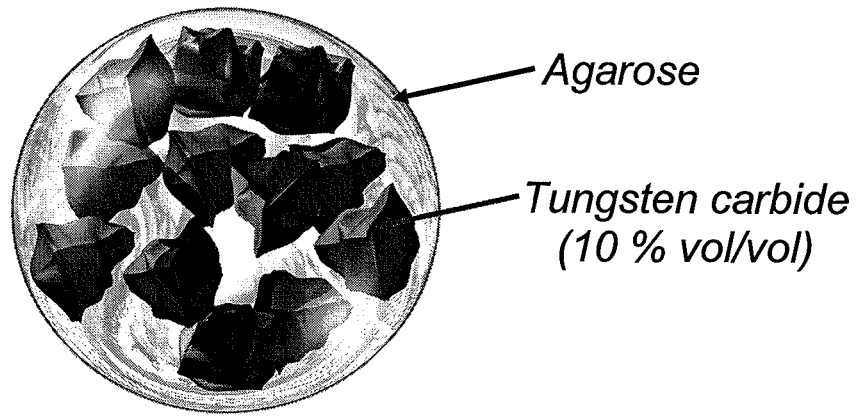
FIG. 4 shows the conceptual structure of high density agarose beads comprising tungsten carbide particles entrapped in the agarose polymer network as used in examples 1 and 2.

As indicated in FIG. 1 the outlet port from the inline mixer was connected to a stainless steel pipe (17.2 mm ID carrying a flow of cooled White oil through a 20 mm long and 6 mm ID, stainless steel connection pipe. The flow rate of cold White oil was 33 L/min (about 19 times the flow rate of the hot emulsion) and the oil temperature before mixing with the hot emulsion was 13° C. The temperature measured after mixing of the hot emulsion in the vigorous flow of cold White oil was always less than 30° C. and the melted agarose/tungsten carbide droplets in the emulsion was therefore solidified by gelation of the agarose (gelation point approx. 36° C.), thus forming beads of agarose comprising tungsten carbide particles dispersed within the gelled agarose as illustrated in the FIG. 4.

The time span from the emulsion leaves the mixing chamber of the inline mixer and until it is efficiently cooled by mixing with the vigorous flow of cold oil corresponds to the time the emulsion is spending in the connection pipe (this time the emulsion spends in the connection pipe may be called the connection pipe holding time). The liquid filling volume of the connection pipe is approx. 0.57 ml (0.00057 L) and therefore the connection pipe holding time for the hot emulsion at a total flow rate of 1.7 L/min. can be calculated as 0.57/(1.7×1000) min.=0.000335 min or approx. 0.02 seconds.

The solidified beads in the cold White oil was separated by dispersion of the suspension in a water tank, whereby the hydrophilic agarose/tungsten carbide beads separated into the aqueous phase and the White oil was forming a top phase which could then be used again in the process.

The separated agarose/tungsten carbide beads were then washed several times with demineralised water and water containing 1% sodium lauroyl sulfate (SDS) to remove any remaining oil on the surface of the beads. The washed beads were then separated by filtration on 250 micron nylon net in order to separate the beads into two fractions: Fraction I being beads having a diameter above 250 micron and Fraction II being beads having a diameter below 250 micron. After separation the two fractions were resuspended in water and then allowed to sediment for determination of the volume of sedimented beads in each fraction.

Results

The experiment demonstrated that highly regularly spherical shaped beads having a high density of approximately 2.6 g/ml could be obtained and that the yield of these beads was approximately 90%.

Example 2

Example 1 was repeated several times using varying energy input (varying the RPM of the rotor) in the inline mixing chamber:

Experiment A: RPM set to: 6000 RPM
Experiment B: RPM set to: 4000 RPM
Experiment C: RPM set to: 3000 RPM
Experiment E: RPM set to: 1000 RPM
Experiment F: RPM set to: 500 RPM
Experiment G: RPM set to: 200 RPM
Experiment H: RPM set to 0 RPM For each experiment the resulting volume of sedimented beads having a diameter below 250 micron was determined relative to the total volume of beads produced (above as well as below 250 micron). This is called the Product Yield and is calculated and expressed as a percentage of the total bead volume produced.

$$\text{Product Yield} = (\text{volume of beads} < 250 \text{ micron})/(\text{total volume of beads produced}) \times 100\%.$$

Results

Figure 2:
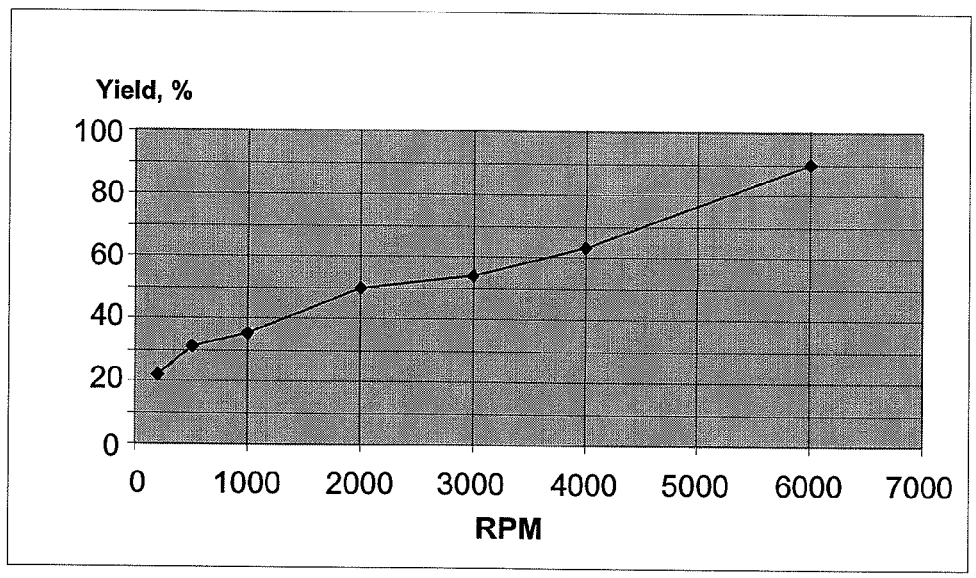
FIG. 2 shows the product yield as a function of Inline mixer rotation speed.

The Product Yield as a function of Inline mixer rotation speed is demonstrated in FIG. 2.

At zero RPM (experiment H) practically no beads were formed illustrating that the static mixing effect of the Emulsor Screen was far from adequate in making an emulsion from the agarose/tungsten carbide. The precipitates formed in experiment H (RPM=0) relates merely to aggregates; deformations and misshapen structures; and fibrous entities of agarose and tungsten carbide.

Product Yield as a function of energy input:

The L4RT Inline Mixer used in the example has a full speed effect corresponding to 250 Watt. The mixing chamber wherein the emulsification is taking place prior to cooling has a liquid filling volume of approximately 0.070 L. Thus, at full speed (8000 RPM) of the in-line mixer the energy input per liter of liquid is approximately:

250 Watt/0.07 L=3,571 Watt/L.

Figure 3:
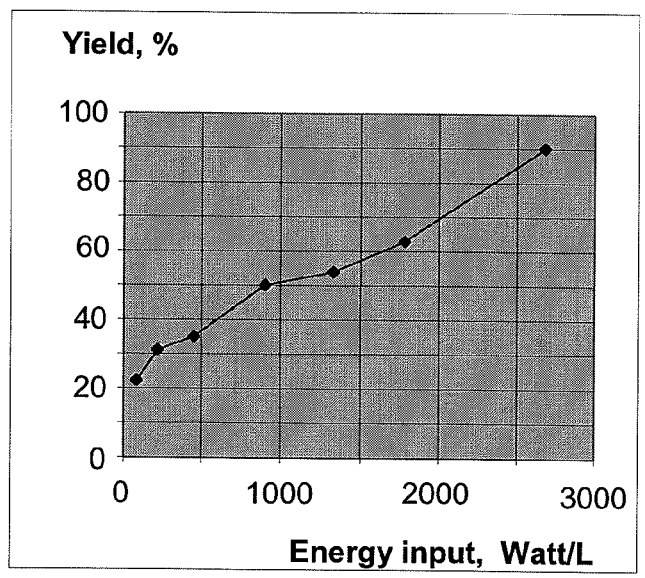
FIG. 3 shows the product yield as a function of the external mechanical energy input per liter reactor volume.

In FIG. 3 the Product Yield is expressed relative to the input of external, mechanical energy per L emulsification 'reactor' volume by assuming a linear relationship between the rotation speed applied and the energy transferred into the reactor.

LIST OF REFERENCES

EP 1 764 151 (same as US 2007/0069408)
WO 92/00799

EMBODIMENTS

1. A method for producing high density bead(s) having a density of 1.5 g/mL or more and comprising a density controlling core particle surrounded by a polymeric material, said method comprises the steps of:
   (i) adding (a) an aqueous suspension comprising the density controlling core particle and the polymeric material; and (b) a first organic phase to a first reactor;
   (ii) subjecting the aqueous suspension and the first organic phase, to means for emulsification by addition of external mechanical energy creating an emulsion comprising individual high density droplet(s) comprising the density controlling core particle surrounded by the polymeric material in the first organic phase, such as the first organic phase (wherein the density controlling core particle surrounded by the polymeric material provides a discontinuous phase and the first organic phase provides a continuous phase);
   (iii) stabilising the high density droplets by transferring the emulsion from the first reactor to a stabilisation reactor where the temperature of the emulsion obtained in step (ii) is reduced to a temperature below the gelation point of the polymeric material within 5 minutes or less and the high density beads are formed,
wherein steps (i) and/or (ii) are conducted at a temperature above the gelation point of the polymeric material.

2. A method according to embodiment 1, wherein the external mechanical energy correspond to at least 10 Watt/L.

3. A method according to any one of the preceding embodiments, wherein the external mechanical energy is provided by the action of a mechanical mixer (or a dynamic mixer).

4. A method according to embodiment 3, wherein the mechanical mixer (or the dynamic mixer) is operated at a speed of 500 rpm or more.

5. A method according to any one of the preceding embodiments, wherein the polymeric material is agarose.

6. A method according to any one of the preceding embodiments, wherein the density controlling core particle has a density of 3 g/mL or more.

7. A method according to any one of the preceding embodiments wherein the high density droplets are stabilised by contacting the emulsion of step (iii) or part of said emulsion with a second organic phase in the stabilisation reactor.

8. A system comprising a first reactor, said first reactor comprises:
   (i) means for emulsifying (a) an aqueous suspension comprising a density controlling core particle and a polymeric material; and (b) a first organic phase, by addition of external mechanical energy to create an emulsion comprising individual high density droplet(s) comprising the density controlling core particle surrounded by the polymeric material in the first organic phase (wherein the density controlling core particle surrounded by the polymeric material provides a discontinuous phase and the first organic phase provides a continuous phase); and
   (ii) at least one outlet, said outlet is transferring the emulsion from the first reactor to a stabilisation reactor for stabilising the high density droplet(s).

9. A system according to embodiment 8, wherein the stabilisation reactor is further connected to a bead isolation reactor.

10. A system according to any one of embodiments 8-9, wherein the bead(s) isolation reactor comprise one outlet for the removal of a high density stabilised bead(s) and/or a first recycle outlet for transferring the first organic phase back to the first reactor and/or one a second recycle outlet for transferring the second organic phase back to the stabilisation reactor.

11. A system according to any one of embodiments 8-10, wherein the bead isolation reactor comprises an aqueous environment.

The invention claimed is:

1. A method for producing beads comprising the steps of:
   (i) forming a combined liquid composition and a first hydrophobic phase by combining (a) a liquid composition comprising a material capable of gelation; and (b) a first hydrophobic phase;
   (ii) subjecting the combined liquid composition and the first hydrophobic phase to emulsification in a first reactor by adding an external mechanical energy input of at least 100 Watt/L thereby creating an emulsion comprising individual droplets comprising the material capable of gelation in the first hydrophobic phase, wherein the material capable of gelation provides a discontinuous phase and the first hydrophobic phase provides a continuous phase;
   (iii) stabilising the droplets by transferring the emulsion obtained in step (ii) from the first reactor to a stabilisation reactor; and
   (iv) subjecting the emulsion in the stabilisation reactor to gelation conditions within 1 second or less after receiving the external mechanical energy input according to step (ii) sufficient to cause gelation of the material capable of gelation in the droplets to thereby form the beads.

2. The method according to claim 1, wherein the material capable of gelation comprises a polymeric material.

3. The method according claim 1, wherein the liquid composition is a suspension.

4. The method according to claim 1, wherein the liquid composition is a solution.

5. The method according to claim 1, wherein the first hydrophobic phase comprises at least one of an organic phase and an inorganic phase.

6. The method according to claim 1, wherein the external mechanical energy is provided by a mechanical mixer operated at a speed of 100 rpm or more.

7. The method according to claim 1, wherein at least one of steps (i) and (ii) is conducted at a temperature above a gelation point of the material capable of gelation.

8. The method according to claim 1, wherein the beads are high density beads comprising a polymeric material and a density controlling core particle.

9. The method according to claim 1, wherein step (iii) is practiced by contacting at least a part of the emulsion of step (ii) with a second hydrophobic phase in the stabilisation reactor.

10. The method according to claim 9, further comprising isolating the beads from the second hydrophobic phase by transferring the beads from the stabilisation reactor to a beads isolation reactor.

11. The method according to claim 10, further comprising recycling at least a part of the first hydrophobic phase to the first reactor and/or recycling at least a part of the second hydrophobic phase to the stabilisation reactor.

12. The method according to claim 2, wherein the polymeric material comprises natural or synthetic organic polymers.

13. The method according to claim 12, wherein the polymeric material is selected from the group consisting of polysaccharides and other carbohydrate based polymers.

14. The method according to claim 12, wherein the polymeric material is selected from the group consisting of agar-agar, alginate, carrageenan, gelatine, guar gum, gum arabic, gum ghatti, gum tragacanth, karaya gum, locust bean gum, xanthan gum, agaroses, celluloses, pectins, mucins, dextrans, starches, heparins, chitosans, hydroxy starches, hydroxypropyl starches, carboxymethyl starches, hydroxyethyl celluloses, hydroxypropyl celluloses, and carboxymethyl celluloses, acrylic polymers, polyamides, polyimides, polyesters, polyethers, polymeric vinyl compounds, polyalkenes, and substituted derivatives thereof, as well as copolymers, substituted derivatives and mixtures thereof.

15. The method according to claim 1, wherein the material capable of gelation comprises natural or synthetic organic polymers that are selected from the group consisting of agar-agar, gelatine, agaroses and acrylic polymer.

16. The method according claim 3, wherein the liquid composition is an aqueous suspension.

17. The method according to claim 5, wherein the first hydrophobic phase comprises an oil as an organic phase.

18. The method according to claim 17, wherein the oil is a mineral oil.

19. The method according to claim 1, wherein the external mechanical energy input is at least 250 Watt/L.

20. The method according to claim 1, wherein the external mechanical energy input is at least 1000 Watt/L.

21. The method according to claim 1, wherein the external mechanical energy input is at least 2000 Watt/L.

22. The method according to claim 6, wherein the mechanical mixer is operated at a speed of 200 rpm or more.

23. The method according to claim 22, wherein the mechanical mixer is operated at a speed of 500 rpm or more.

24. The method according to claim 22, wherein the mechanical mixer is operated at a speed of 1000 rpm or more.

25. The method according to claim 22, wherein the mechanical mixer is operated at a speed of 3000 rpm or more.

26. The method according to claim 22, wherein the mechanical mixer is operated at a speed of 6000 rpm or more.

27. The method according to claim 12, wherein the natural or synthetic organic polymers are selected from agaroses.

28. The method according to claim 1, wherein step (iv) includes subjecting the emulsion to thermal gelation conditions to obtain gelation of the material capable of gelation within 0.5 seconds or less after receiving the external mechanical energy input according to step (ii).

29. The method according to claim 28, wherein the thermal gelation is practiced to obtain gelation of the material capable of gelation within 0.05 seconds or less after receiving the external mechanical energy input according to step (ii).

30. The method according to claim 9, wherein the second hydrophobic phase comprises at least one of an organic phase and an inorganic phase.

31. The method according to claim 30, wherein the second hydrophobic phase is an oil.

32. The method according to claim 31, wherein the oil is a mineral oil.

33. A method for producing high density beads having a density of 1.5 g/mL or more, and comprising a density controlling core particle surrounded by a polymeric material, wherein the method comprises the steps of:
  (i) adding to a first reactor (a) an aqueous suspension comprising the density controlling core particle and the polymeric material, and (b) a first organic phase, wherein the aqueous suspension and the first organic phase are maintained at a temperature above the a gelation point of the polymeric material;
  (ii) subjecting the aqueous suspension and the first organic phase to emulsification adding an external mechanical energy input of at least 100 Watt/L thereby creating an emulsion comprising individual high density droplets comprised of the density controlling core particle surrounded by the polymeric material in the first organic phase, wherein the density controlling core particle surrounded by the polymeric material provides a discontinuous phase and the first organic phase provides a continuous phase, and wherein the emulsion is maintained at a temperature above the gelation point of the polymeric material; and
  (iii) stabilising the high density droplets by transferring the emulsion obtained in step (ii) from the first reactor to a stabilisation reactor; and
  (iv) subjecting the emulsion to thermal gelation conditions by reducing the temperature of the emulsion within 1 second or less after receiving the external mechanical energy input according to step (ii) to a temperature below the gelation point of the polymeric material to thereby form the high density beads.

34. The method according to claim 33 wherein the beads have a density of 2.0 g/mL or more.

35. The method according to claim 34, wherein the beads have a density of 3.0 g/ml or more.

36. A method for producing high density agarose beads having a density of 2.0 g/ml or more and comprising tungsten carbide as a density controlling core particle surrounded by agarose as a polymeric material, wherein the method comprises the steps of:
  (i) adding to a first reactor (a) an aqueous suspension comprising tungsten carbide and the agarose, and (b) a mineral oil, wherein the aqueous suspension and the mineral oil are maintained at a temperature above the gelation point of the agarose;
  (ii) subjecting the aqueous suspension and the mineral oil to emulsification by adding an external mechanical energy input of at least 100 Watt/L thereby creating an emulsion comprising individual high density droplets comprising tungsten carbide surrounded by agarose in the mineral oil, wherein the tungsten carbide surrounded by agarose provides a discontinuous phase and the mineral oil provides a continuous phase, and wherein the emulsion is maintained at a temperature above the gelation point of the agarose; and (iii) stabilising the high density droplets by transferring the emulsion obtained in step (ii) from the first reactor to a stabilisation reactor; and (iv) subjecting the emulsion to thermal gelation conditions by reducing the temperature of the emulsion within 1 second or less after receiving the external mechanical energy input according to step (ii) to a temperature below the gelation point of the agarose to thereby form the high density beads.

* * * * *